(12) United States Patent
Smith

(10) Patent No.: US 9,693,654 B2
(45) Date of Patent: Jul. 4, 2017

(54) AUTOMATIC COOKER

(71) Applicant: Dennis Carl Smith, San Francisco, CA (US)

(72) Inventor: Dennis Carl Smith, San Francisco, CA (US)

(*) Notice: Subject to any disclaimer, the term of this patent is extended or adjusted under 35 U.S.C. 154(b) by 96 days.

(21) Appl. No.: 14/797,022

(22) Filed: Jul. 10, 2015

(65) Prior Publication Data

US 2016/0367073 A1    Dec. 22, 2016

Related U.S. Application Data

(60) Provisional application No. 62/023,791, filed on Jul. 11, 2014.

(51) Int. Cl.
*A47J 36/00* (2006.01)
*A47J 27/00* (2006.01)
*A47J 36/34* (2006.01)
*A47J 36/16* (2006.01)
*A47J 43/046* (2006.01)
(Continued)

(52) U.S. Cl.
CPC ............ *A47J 36/34* (2013.01); *A47J 27/14* (2013.01); *A47J 36/165* (2013.01); *A47J 43/046* (2013.01); *A22C 9/005* (2013.01); *A47J 27/00* (2013.01)

(58) Field of Classification Search
CPC ........ A47J 36/165; A47J 27/004; A22C 9/005
USPC .... 99/348, 534, 494; 34/586, 588, 108, 109, 34/126, 130, 602, 185; 366/244, 248, 366/252, 279, 309, 314, 325.92, 231, 230
See application file for complete search history.

(56) References Cited

U.S. PATENT DOCUMENTS 2,543,495 A * 2/1951 Henry .................... B01F 9/103
                                                    366/231
4,173,925 A * 11/1979 Leon ...................... A47J 27/14
                                                    219/389

(Continued)

OTHER PUBLICATIONS

50L Electric_Mini_Cooking_Kettle manufactured by Baoding Jiali Food Machine Co., LTD, Rongcheng County, Baoding, Hebei. China, as printed from http://bdjljx.en.alibaba.com/product/599434652-212887612/50L_Electric_Mini_Cooking_Kettle.html on Aug. 5, 2015.

*Primary Examiner* — Reginald L Alexander
(74) *Attorney, Agent, or Firm* — Patent Law Offices of Michael E. Woods; Michael E. Woods

(57) ABSTRACT

A system and method to address the shortcomings of previous and existing designs by incorporating novel and unique features allowing the invention to perform well for a wide variety of popular dishes and meal solutions. Some embodiments of the present invention include a kitchen countertop barrel cooker which rotate bite size or smaller food ingredients around a horizontal axis and use a unique tumbler blade design which also rotates food around perpendicular horizontal axes resulting in thorough mixing and equalization of temperature throughout. The resulting uniform temperature allows readings from a non-contact infrared sensor to be relevant and effective for automatically assessing and controlling doneness. The embodiments vary primarily in how ingredients are handled. Each allows the draining of unwanted liquid from the ingredient contents during cooking or before unloading.

12 Claims, 35 Drawing Sheets

(51) Int. Cl.
*A47J 27/14* (2006.01)
*A22C 9/00* (2006.01)

(56) References Cited

U.S. PATENT DOCUMENTS

| | | | | |
|---|---|---|---|---|
| 4,214,518 A | * | 7/1980 | Petsche | A22C 9/005 |
| | | | | 292/260 |
| 4,649,810 A | | 3/1987 | Wong | |
| 5,259,300 A | * | 11/1993 | Yajima | A47J 37/047 |
| | | | | 366/225 |
| 6,145,432 A | * | 11/2000 | Bellue, Jr. | A23B 4/005 |
| | | | | 366/139 |
| 6,153,240 A | * | 11/2000 | Tottenham | A23B 7/0053 |
| | | | | 426/231 |
| 8,122,815 B2 | * | 2/2012 | Wolfe | A47J 36/165 |
| | | | | 219/389 |
| 8,707,862 B1 | * | 4/2014 | Oliver | A47J 36/165 |
| | | | | 99/326 |
| 2002/0102341 A1 | * | 8/2002 | Ludwig | A23B 4/20 |
| | | | | 426/519 |
| 2009/0208621 A1 | * | 8/2009 | Dotan | A47J 37/1214 |
| | | | | 426/389 |

* cited by examiner

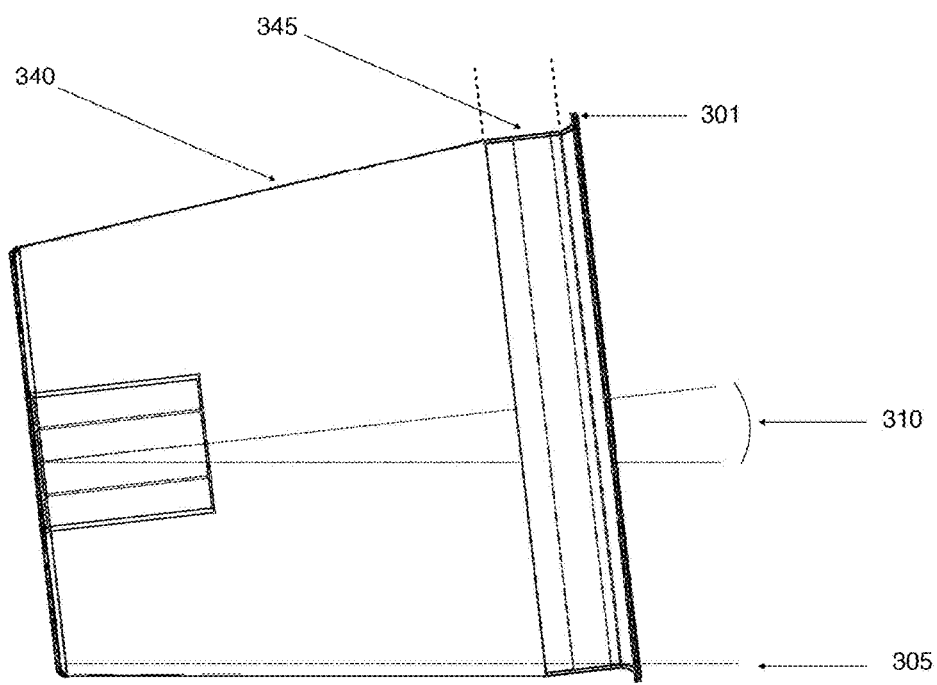
FIG. 3
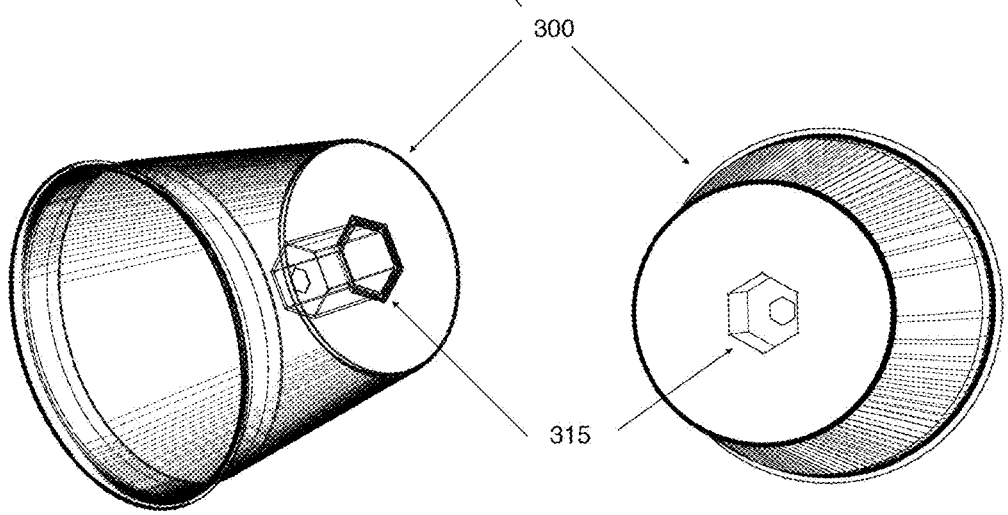
FIG. 3A
FIG. 3B

LEGEND FOR LOGIC DIAGRAMS

H2 — "Heat to" setting     SH — "Stay Hot" setting     KW — "Keep Warm" setting

S — rotation speed setting     ST — temperature reading from sensor (post algorithm)

T170 — clock timer     T1 — clock timer     T2 — clock timer

BS — setting for bin door drop     B0 — set at "no bin"

B1 — set at "Beginning of Stay Hot" time

B2 — set at "End of Stay Hot" time     B3 — set at "Beginning of Keep Warm" time FIGURE 21
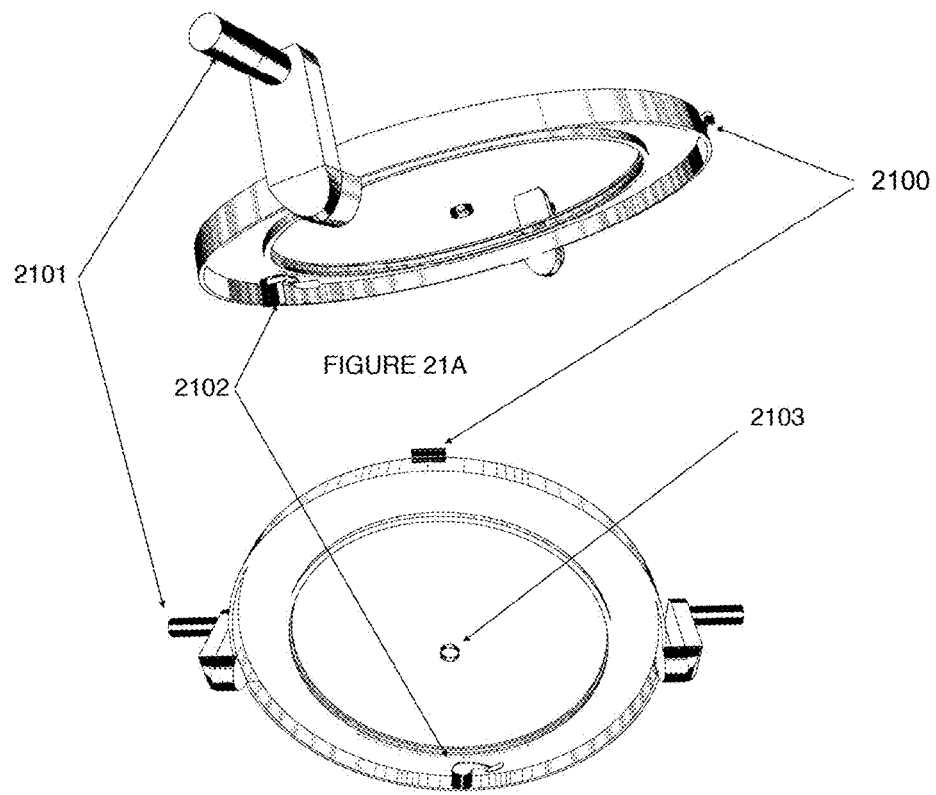
FIGURE 21A
FIGURE 21B
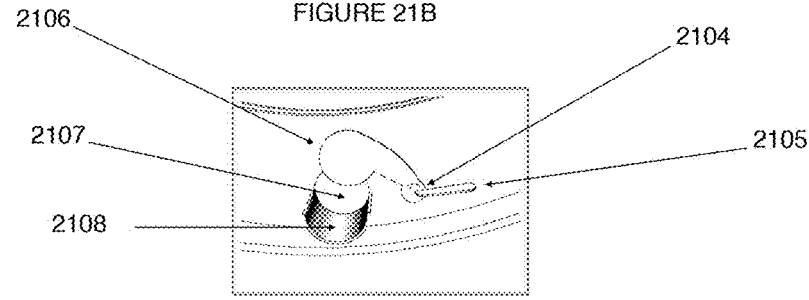
FIGURE 21C
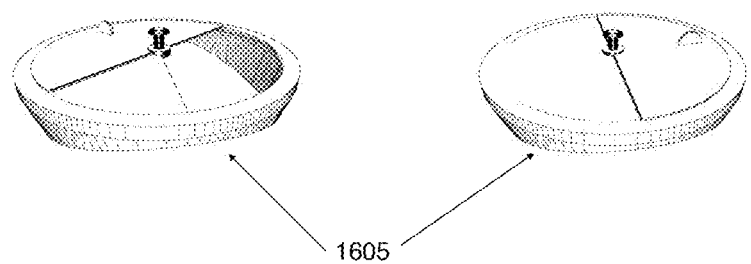

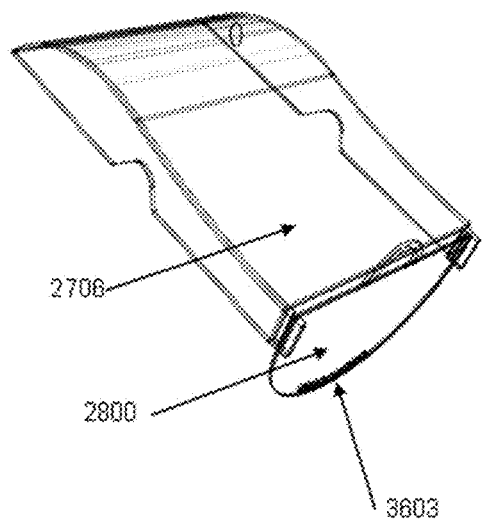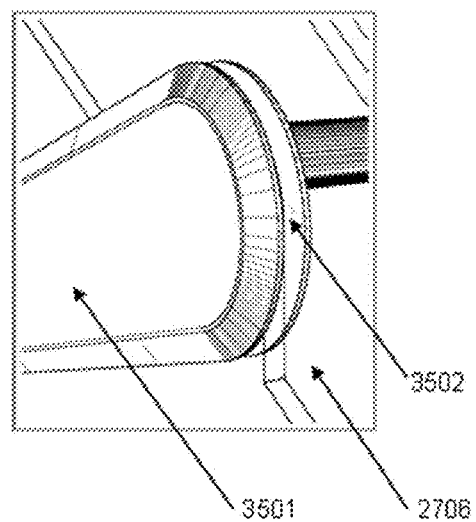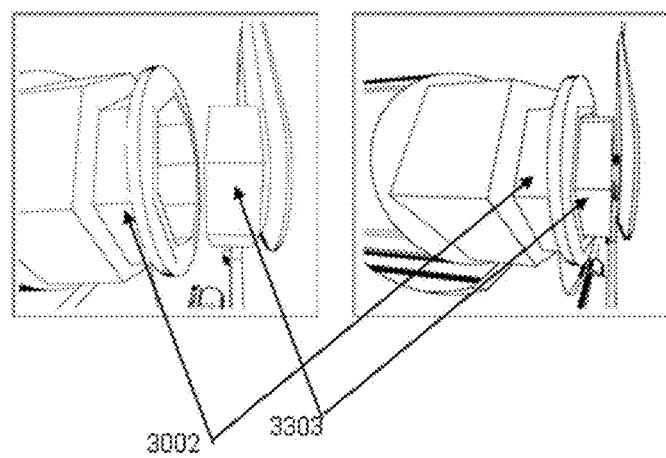

AUTOMATIC COOKER

CROSS REFERENCE TO RELATED APPLICATIONS

This application claims benefit of U.S. Patent Application No. 62/023,791 filed 11 Jul. 2014, the contents of which are hereby expressly incorporated by reference thereto in its entirety for all purposes.

FIELD OF THE INVENTION

The present invention relates generally to commercial and consumer cooking devices, and more specifically, but not exclusively, to home cooking appliances.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The idea of cooking food in a rotating horizontal barrel or rotating the food in a stationary barrel, while not new, has not succeeded at the consumer level. So far, the increased kitchen productivity allowed by the method has not been realized.

In the USA and many other markets over the last half century dual incomes have become increasingly necessary to support a household. As a result the percent of meals cooked at home has fallen by half. More convenient options are overwhelmingly less healthy and are thought to be responsible for increasingly widespread lifestyle diseases such as type II diabetes. Studies have shown that meals prepared at home are almost universally healthier than meals prepared elsewhere.

Many health pundits publish books all recommending buying fresh whole foods and cooking them at home. But the task of planning, shopping for, prepping and competently cooking a meal at home is too overwhelming for today's stressed out, time constrained homemakers. Also, many avoid home cooking because they simply don't have the skills and/or an adequate pantry and kitchen.

The food industry has responded by offering more prepped-for-cooking items such as fresh chopped onions, stir fry packs, and skillet meals, both fresh and frozen. But the cooking task has seen no equivalent advance.

What is needed is a system and method to address the shortcomings of previous and existing designs by incorporating novel and unique features allowing the invention to perform well for a wide variety of popular dishes and meal solutions.

BRIEF SUMMARY OF THE INVENTION

Disclosed is a system and method to address the shortcomings of previous and existing designs by incorporating novel and unique features allowing the invention to perform well for a wide variety of popular dishes and meal solutions. Implementations of the present systems and methods easily and accurately cook a wide variety of dishes and meal solutions with predictable, repeatable, error-free and flavor maximized results, often with no user input or involvement once the process is started.

The following summary of the invention is provided to facilitate an understanding of some of technical features related to the front loading partially tapered barrel cooker, the compact barrel cooker, the personal barrel cooker, and other automatic cookers, and is not intended to be a full description of the present invention. A full appreciation of the various aspects of the invention can be gained by taking the entire specification, claims, drawings, and abstract as a whole. The present invention is applicable to other devices other than the front loading partially tapered barrel cooker.

An object of the present invention is to address shortcomings of other methods of convenience cooking: microwave cooking (uneven heating, poor doneness regulation of many foods, excess water accumulation), crockpot cooking (long cooking times), rice cookers (no ability to blend flavors, ingredients), and programmed convection/microwave/infrared ovens (often very challenging to clean) and the like.

It is an object of this invention to fill a need of improving conveniences and efficiencies of an actual cooking task to the conveniences and efficiencies of the packaging and pre-preparation—an important link now needed to make cooking at home easy and stress free.

The method of cooking recognizes two facts. (1) If relatively small (bite size or less) ingredients are constantly being mixed to receive heat transferred not only from the hot cooking surfaces but also from particle to particle, the resulting temperature will be nearly uniform so that (2) a surface temperature as measured by a non-contact infrared sensor will fairly represent the temperature throughout the food—not just the surface.

Also, the energy needed to cook a piece of food through is related to its size (more precisely, the shortest distance to center). Therefore, ingredients with varying cooking rates can be adjusted to cook with the same amount of energy by varying the piece size. For example, bite size broccoli florets (fast cooking) can be combined with thin carrot "chips" (carrots are slow cooking) to both cook to equal doneness with the same amount of energy. This piece sizing is commonly done in combined ingredient stir fry packages and skillet meals available at many stores.

With proper piece sizing a large number of foods (soft vegetables and meats) become properly done when raised to a common temperature that is around 170° Fahrenheit. Another class of foods—primarily dense vegetables (root vegetables, some squashes, and the like) require higher temperatures and/or more extended hot time. A third category includes foods that hydrate (e.g., dried beans) which require extended hot times.

Nevertheless, these categories can often be combined. Some food packages offered at stores include some ingredients that are fully or partially cooked so that the combination can be cooked together.

Using constant mixing and an infrared sensor, embodiments of the invention are able to accommodate these categories by allowing the user to enter a temperature to which the food will be heated ("Heat up to" or "target temp" on the control panel), a time for which cooking temperatures will be maintained ("Hot time" or "maintain temp" on the control panel) and a temperature at which the food will be kept for serving ("Keep warm at" temperature on the control panel). The "hot time" begins when the sensor senses that the "Heat up to" target temperature has been reached, and heating is regulated to keep food at the "keep warm at" temperature when the "hot time" is completed.

The only other setting is an optionally variable rotational speed, which is preset to a standard speed ("normal") and offers a slower speed for liquids, a slightly higher speed for small loads, and a higher speed for cooling—a setting at which any heating is disabled. The higher speed causes contents to be rotated higher and dropped further as compared to a slower speed, causing them to cool faster. This would be used when the user wants hot food brought down to a serving temperature with less waiting. The set speed remains constant throughout the warming, cooking and keep warm phases unless the user engages the "pause" button, changes the speed, and then re-engages "start".

Optionally, there is a setting for when an ingredient bin can dispense its contents into the cooking barrel.

With this method a great many dish and meal solutions can be accurately cooked. The constant mixing of this method also serves to maximize flavors from herbs, spices, and cooking oils. Also, the ability to drain excess fluids and subsequently add flavorings insures flavors don't get washed away as they do in stovetop pans and microwaves.

Some embodiments of the present invention enclose a removable cook pot in a housing that pivots the entire mechanism except its base so that the front of the cook pot can be pointed up, down or somewhere in between. Tilt is controlled by the user using a hand grip with a lock release button. A fixed center spindle in the back of the housing is surrounded by a hexagonal (or other locking shape) sleeve rotating about the spindle on bearings, with rotation driven by a gear set connected to a variable speed electric motor mounted on the rear of the housing. The cook pot has a coordinating hexagonal inset which slides over the rotating sleeve to mount the cook pot in the cooking position and holds it there by secure fit and/or magnets. The tumbler blade has a hexagonal base that slides over the hexagonal inset within the pot to secure itself so that it rotates in fixed position relative to the pot. A lower extension of the housing contains the heating mechanism—a heating coil (or energy coil in the case of induction as a heat source) is contoured to the bottom of the pot to maximize efficiency. The bottom of the housing also contains other components needed by the heating system including electronics and cooling fan(s). At the front of the cook pot a donut shaped retainer ring can be attached or removed by tightening or loosening a clasp. The retainer ring prevents solid contents from falling out of the pot but leaves a small gap around its perimeter to allow fluids to pour out when the front of the pot is lowered. An optional use silicone gasket can be mounted around the perimeter of the retainer ring to seal the gap to retain fluids. A swing arm assembly is mounted to the side of the top of the housing to allow it to pivot to an open position needed for removal of the pot or to a closed position for operation. An accessory mount on the swing arm allows the mounting of accessories such as an automated ingredient bin which can add ingredients into the pot at selected points in the cooking procedure. The control panel is also mounted on the swing arm and can be activated only when in the arm is in the closed operating position. The infrared sensor is mounted under the control panel and looks through the window in the retainer ring. A positioner on the other side of the housing secures the far end of the swing arm and detects proper operating position. The pot is intended to be removed or installed only when empty and when it is safely cool. With the swing arm open the pot can be tilted up for loading with or without the retainer ring installed. After cooking the pot can again be tilted up (with the swing arm open) for removal of the retainer ring, then tilted down to empty its contents into a container positioned below.

An important characteristic of the structure and method of the illustrated embodiments is equalization of a temperature of ingredients so that the cooking status of the food can be determined by looking only at a surface of the food with an IR sensor. Temperature equalization is improved by a thoroughness of the mixing so hot spots and cool spots neutralize each other. The disclosed structure and method not only mixes top to bottom, but inside to outside on each rotation due, at least in part, to the cupped tumbler blade design. Industrial solutions do not work well for home cooking because cooking oils pool at a low spot creating more cooling of part of the cooking surface while the unwetted parts may overheat which could damage sensitive non-stick coatings. The cupped blade allows a level bottom with even fluid (cooking oil and the like) levels front to rear and even cooling of the heated area. Another characteristic of some preferred embodiments is that the food be "bite-sized" to make tumbling of the ingredients easy. For example, a solid ingredient piece size is desirably no larger than ⅛ the diameter being swept by the blade. Herein for purposes of the patent application, this size is referred to as bite size. Alternatively in some embodiments, the largest dimension should be no more than an inch for a device of this size. Smallness is also desirable to limit a difference between the internal and surface temperature of solids/food pieces.

Other important aspects of some embodiments may include: (a) one or more side exits for ingredients cooked in a barrel, especially a side (perimeter) exit in a handheld cook pot; (b) a funneled clamshell lid exit for ingredients in a compact embodiment; (c) a "drain gate" in an embodiment such as a handheld cook pot which allows the user to tilt the pot and drain fluids without emptying ingredients; (d) a front lid drain in an embodiment such as the compact embodiment which allows the user to tilt the pot and drain fluids without emptying ingredients; and e) a tumbler blade assembly that is preferably removeable and replaceable (allowing the cooking chamber to be more easily cleaned and allows a simpler manufacture of the cooking chamber that does not require mounting holes for the tumbler blade).

In some embodiments of the present invention, a removable cook pot does not rotate, with the tumbler blade rotating using a similar drive mechanism but with the motor tucked inside the housing and connected to the rotating mechanism by a series of gears. Openings in the cook pot itself allow ingredients to be added through the top, and the sensor to look in through the side. Tilt is limited to lowering the front no more than 10 degrees for draining fluids. For unloading, a funneled clamshell front lid opens to allow controlled exit of ingredients, including liquids. The lid is opened and closed by raising/lowering a cam with a handle on which the controls are located. Much less space is needed since the pot does not tilt up and ingredient exit is more downward.

In some embodiments, a non-rotating cook pot is exposed and not inside a housing. Ingredients are added from the top with the cover off, and are unloaded from a side perimeter exit, not out the front. The sensor looks through the cover. Opposite the exit a handle lets the user grasp the pot and perform all necessary tilting actions freehand after easily disengaging the drive mechanism. Such embodiments may be appropriate for smaller sizes where handling weight supported by a single hand is easy for any user.

In some alternative embodiments the hand operated tilt mechanism may be motorized and automated which would allow, for example, unassisted draining of fluids. Rotation may be variable and reversible rather than fixed. The ingredient bin may be equipped to handle multiple ingredients added at different times. To simplify the programming of the additional complex procedures, the operational sequence may be controlled through an app on a connected smart mobile device which can access the cloud to get cooking operation sequencing for recipes that match ingredients collected by the user or "ingredient packs" sold by food providers. The control can be interactive with the app determining when heating rates or other parameters are not as expected. The user can then be alerted or the cooking sequence can be altered based on cooking modeling knowledge in the cloud. This engaged ecosystem could also contain apps to help the user find and order food and recipes, provide operational feedback to the machine's designers, and charge commissions to food retailers and reimburse the recipe developer community for recipe completions reported by the app.

An automated cooker processing a plurality of bite-sized food pieces, including a cooking chamber defining a closed cooking volume having an interior wall surface exposed to the cooking volume, the interior wall surface having a circular arc portion; a heating structure configured to raise a temperature of the interior wall surface to a desired cooking temperature, the desired cooking temperature in a range of ambient up to 400 degrees Fahrenheit (though other ranges are possible); a tumbler blade disposed within the cooking volume and including a leading edge complementary to the circular arc, the tumbler blade having a first portion configured to tumble the food pieces in a first direction within the cooking volume in response to a relative movement between the tumbler blade and the interior wall surface, wherein the tumbler blade includes a second portion configured to tumble the food pieces in a second direction orthogonal to the first direction within the cooking volume in response to the relative movement, the directions evenly heating exterior surfaces of the food pieces, responsive to the cooking temperature, up to 225 degrees Fahrenheit (though other temperature ranges are possible); a drive mechanism coupled to the tumbler blade and the cooking chamber, the drive mechanism configured to produce the relative rotation between the tumbler blade and the interior wall surface; and a non-contact thermal probe, outside the cooking volume, configured to determine a surface temperature of the exterior surfaces through an aperture in the interior wall surface; and a controller, coupled to the non-contact thermal probe, the heating structure, and to the tumbler blade, to operate the heating structure and the relative rotation until the surface temperature represents an internal temperature of the food pieces.

A method for cooking a plurality of bite-sized food pieces, including a) adding the food pieces into a closeable cooking chamber, the cooking chamber defining a cooking volume having an interior wall surface exposed to the cooking volume, the interior wall surface having a circular arc portion; b) heating the interior wall to a desired cooking temperature, the desired cooking temperature in a range of ambient up to 400 degrees Fahrenheit; c) circulating the food pieces within the cooking chamber using a rotating tumbler blade, the circulating step c) tumbling the food pieces inside the cooking volume with a tumbling motion having two orthogonal degrees of freedom, the tumbling motion configured to evenly heat the food pieces responsive to the interior wall heated to the desired cooking temperature and responsive to the tumbling motion; d) monitoring a surface temperature of the food pieces during the circulating step c) using a thermal probe directed into the cooking volume; and e) inferring an interior temperature of the food pieces responsive to the surface temperature.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 3, 3A, 3B illustrate the design of the cook pot;

FIGS. 15-26 refer to a "compact embodiment";

FIG. 15 illustrates a perspective view of the exterior of the compact embodiment in operating position;

FIG. 16, 16A illustrate the housing assembly with some features;

FIG. 17 illustrates the support base and tilt mechanism;

FIG. 18 illustrates the device with user removable parts separately;

FIG. 19 illustrates the pot and its features;

FIG. 19A illustrates the center of the pot when installed;

FIGS. 20, 20A and 20B illustrate three views of the funnel ring and its features;

FIG. 21, 21A illustrate the front lid and its features;

FIG. 21B illustrates the front lid drain;

FIG. 21C illustrates the top lid;

FIG. 22 illustrates the tumbler blade assembly and its features;

FIG. 23 illustrates the cam assembly;

FIG. 24 illustrates the control panel;

FIG. 25 illustrates the control logic;

FIG. 26 illustrates the sensor splash guard;

FIGS. 27-37A illustrate a "personal embodiment";

FIG. 27 illustrates perspective views of the exterior of the personal embodiment;

FIG. 28 illustrates user removable parts separately;

FIG. 29 illustrates the movement of the sensor arm;

FIG. 30 illustrates the base and its features;

FIG. 31 illustrates the pot and its features;

FIG. 32 illustrates additional orthographic views of the pot;

FIG. 33 illustrates part of the tumbler blade assembly;

FIG. 34 illustrates the position of the blade in the pot;

FIG. 35 illustrates the remainder of the tumbler bade assembly;

FIG. 36 illustrates the clear top cover and its features;

FIG. 36A illustrates fit of cover and tumbler blade assembly;

FIG. 36B illustrates installation of the drain gate;

FIG. 37 illustrates the engagement of the drive mechanism;

FIG. 37A illustrates an engagement of the drive mechanism;

FIG. 38 illustrates a perspective view of the first tumbler blade;

FIG. 39 illustrates a front view of the first tumbler blade;

FIG. 40 illustrates a top view of the first tumbler blade;

FIG. 41 illustrates a side view of the first tumbler blade;

FIG. 43 illustrates a perspective view of the second tumbler blade;

FIG. 44 illustrates a side view of the second tumbler blade; and

FIG. 45 illustrates a top view of the second tumbler blade;

DETAILED DESCRIPTION OF THE INVENTION

Figure 1:
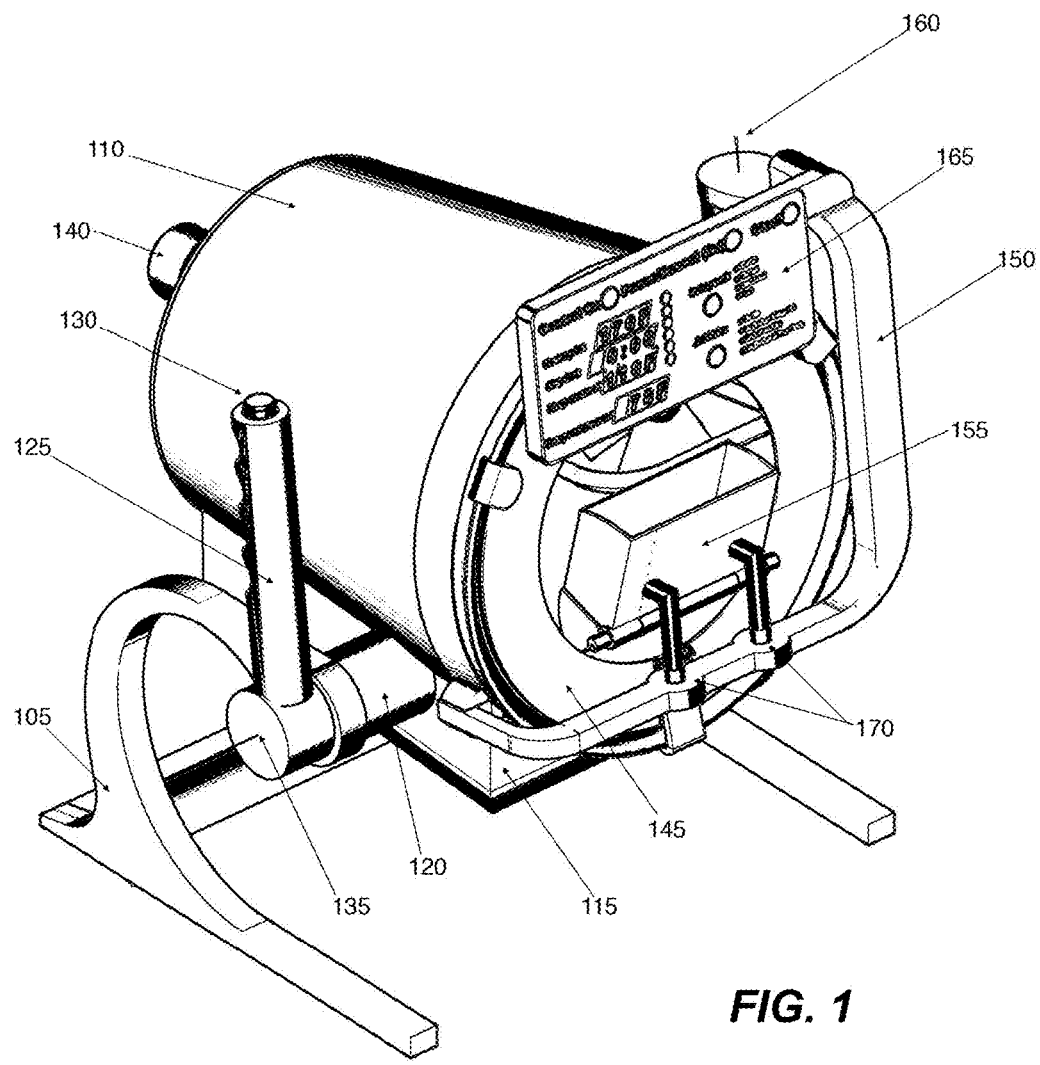
FIG. 1 illustrates a perspective view of the exterior of an embodiment of the invention.

Embodiments of the present invention provide a system and method to address the shortcomings of previous and existing designs by incorporating novel and unique features allowing the invention to perform well for a wide variety of popular dishes and meal solutions. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the term "or" is generally intended to mean "and/or" unless otherwise indicated.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

FIG. 1 illustrates the exterior of the device and shows a base 105 on which the remainder of the device pivots on a horizontal axis at pivot point 135. The housing assembly 1300 contains all parts that do not pivot or rotate about additional axes. The heat shroud 110 is the portion of the housing assembly 1300 that surrounds the pot's circumference and is lined on the inside by insulation and a thermally reflective surface. In the case where heating is supplied by induction, all housing assembly parts are made of magnetically insensitive materials. Support shafts 1305 are mounted through the apertures 1200 in the base 105. Bearings are not likely needed because low friction coatings can be applied and because of the large diameter of apertures 1200 and support shafts 1305. Inside the left side support arm 120 is a mechanism to lock rotation of the housing assembly 1300 except when the lock release button 130 is depressed. A number of well-known techniques to do this are known to those practiced in the art and are not described further here. The range of the rotation permitted by this mechanism is approximately that shown in FIG. 1A. The back plate 1310 is made of high strength rigid material so the fixed spindle 200 retains position when the cantilevered weight of the pot 300 and parts 230, 235, 240, 320, 325, 330, 335 are attached to it as well the weight of any food load. An aperture 205 in back plate 1310 is positioned to allow the shaft from motor 140 to pass through to gear 220 which is attached fixed to the shaft of the motor 140. The motor 140 is fastened to the backside of the back plate 1310. Heating element 225 is contoured to pot 300 to make energy transfer to the pot 300 as efficient as possible. Heating element 225 is supported from underneath in a way appropriate for the method of heating employed. The housing extension 115 may be reshaped if needed in a way to accommodate electrical components required by the heating system, such as coils, fans and circuitry. Alternatively, both the housing extension 115 and heat shroud 110 could be modified to accommodate an open flame heat source. The heating element 225 is close to but does not touch the pot which is moving.

Figure 2:
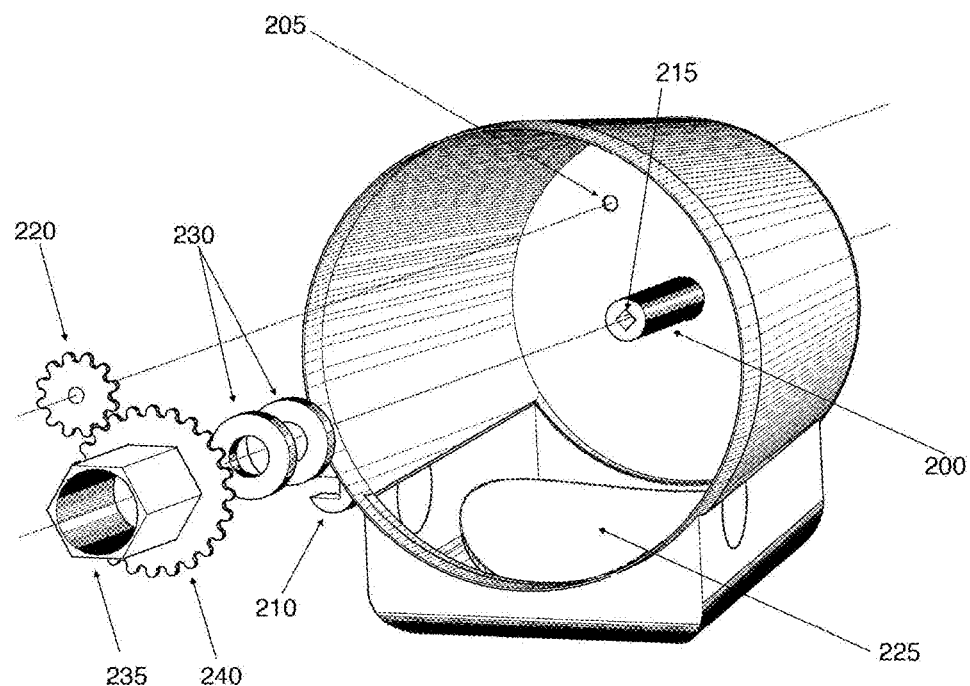
FIG. 2 illustrates the drive mechanism parts inside the central part of the housing exploded.
Figure 2A:
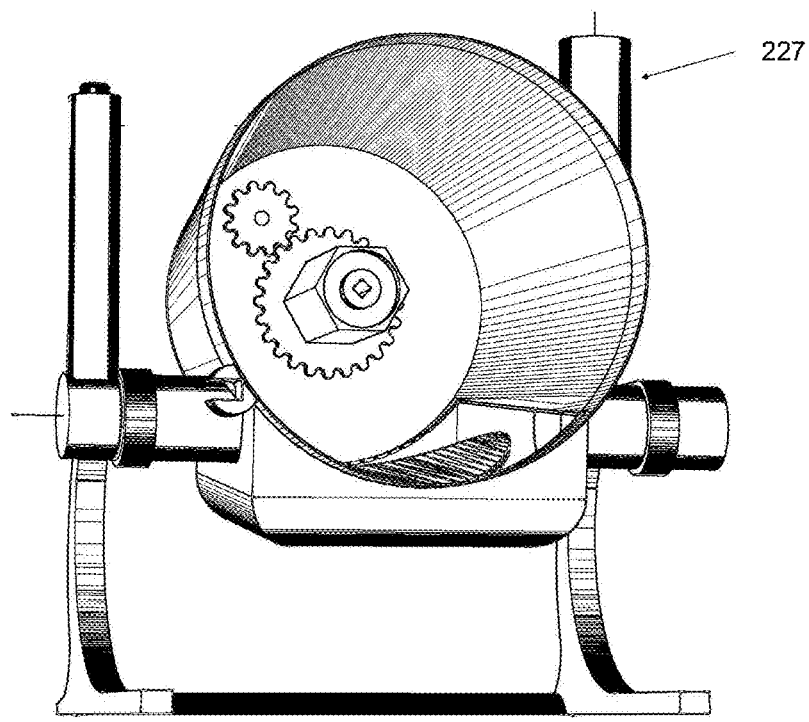
FIG. 2A illustrates the drive mechanism parts inside the central part of the housing in place.

FIGS. 2 and 2A illustrate how bearings 230 have their inner circumference fixed to stationary spindle 200 and their outer rotating circumferences fixed to the inside of sleeve 235 to which sleeve gear 240 is rigidly attached. Sleeve gear 240 engages motor gear 220 to rotate sleeve 235 and, when installed, pot 300 and any parts attached to it. A non-rotating accessory port 215 is a recession into which a non-rotating accessory such as squeegee 325 may be mounted. The accessory can be installed after pot 300 has been installed. Pot 300 has a coordinating center opening in its inset 315 through which the accessory may be mounted. Another example of such an accessory might be a large brush, shaped like a bottle brush, which would contact the inner circumference of the rotating pot 300 to help clean it. The accessory mount 315 can be extended through the rear of back plate 1310 to allow passage for electrical connections and cooling fluids for a sensor(s) to be mounted on an accessory. This would permit the use of a sealing lid in place of retainer ring 145 and allow additional cooking options.

FIGS. 3, 3A, 3B illustrate pot 300 and its central inset 315 which is slid over the sleeve 235 in order to mount the pot for cooking. The pot is mounted with a force fit sufficient to prevent it from sliding off when its front is angled downward, yet still allowing easy removal of the pot 300 by pulling it forward off sleeve 235. In the case of induction heating, the pot will be magnetically sensitive and can be held in place with magnets secured to the inner surface of back plate 1310. FIG. 3 illustrates the tapered portion 340 of the pot's circumference and the non-tapered portion 345. The normal cooking attitude of the pot is illustrated with the bottom tapered portion of the pot positioned exactly horizontally. In this position the non-tapered portion 345 forms a barrier sufficient to retain a sufficient depth of cooking fluids 305 distributed evenly front to rear. This is critically important to cooking performance and maintaining hot surface cooling by those fluids over the entire heated area. Such cooling is essential to preserve any non-stick coatings applied to the pot. When the pot is tilted downward by angle 310 (about 6.5° in the illustration) or more the non-tapered portion 345 no longer presents a barrier so fluids will then drain from the pot 300. The fluids can be captured, for example, in catch bowl 400 supported on catch bowl stand 410 which is customized to be removably secured in serving dish 405. Angle 310 is also the amount the retainer ring 145 is tilted away from vertical, a benefit when dropping ingredients into the pot during operation as the tilt allows ingredients' entry to be made less likely to get stuck by dropping them in at a steeper angle if not completely vertically. The heating element 225 does not extend forward of the tapered portion of the pot 300. The untapered length of the circumference 345 receives little direct heat from the heating element 225. This is because heating is not needed due on the untapped portion 345 due to the benefit described immediately below*. Lack of such forward heating also serves to keep the pot rim 301 cooler and therefore safer since it is not protected from being touched by the heat shroud 110. *A final and important benefit of the tapered pot design is that the pot rotation causes ingredients dropped in at the front to be moved inward as they are lifted by the pot circumference and/or the tumbler blade assembly 320. The pot may be made of any material traditionally used for pots and pans with magnetically sensitive material required for induction heating (usually carbon steel, cast iron or series 400 stainless). Because the pot is always rotating when heat is applied the need for heavy heat distributing layers is minimized. A thinner lighter pot will heat faster and absorb less energy, passing more heat to the contents and increasing performance and efficiency.

Figure 3C:
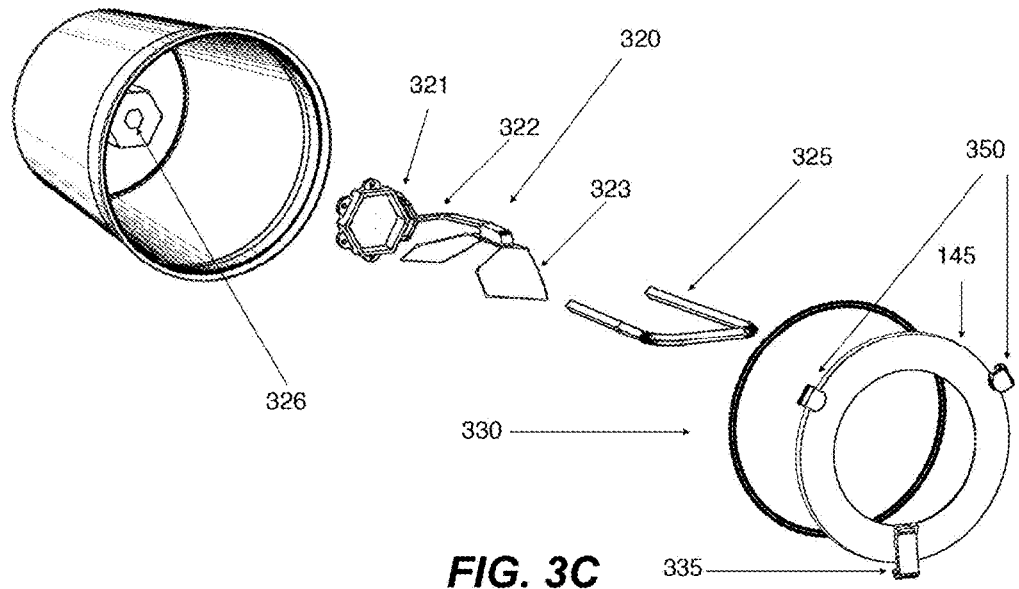
FIG. 3C illustrates parts attached inside the pot for cooking.

FIG. 3C illustrates the attachments normally placed into the pot before cooking. Tumbler blade with hex mount assembly 320 uses a hexagonal base 321 which slides over and fits tightly onto hexagonal pot inset 315 resulting in a rigid position. The blade portion 323 uses a design which tumbles food particles effectively by using its wings to first scoop up the food from the front and rear of pot 300 as it rotates causing that food to pile on top of the food in the center so that it falls to the bottom as the blade rotates further. The food that was in the center ends up on the top of the pile and spreads out to the front and rear. In this way mixing occurs both top to bottom and inside to outside. The squeegee 325 is most likely to be used on pots not having a non-stick surface. It fits into accessory port 215 which is in non-rotating spindle 200. When accessory port 215 is not used the orifice 326 can be sealed with a rubber stopper (not illustrated). Blades 323 are mounted via connector 322 and shaped so that they leave enough clearance between the blade 323 and the pot 300 inner circumference to pass over the squeegee 325 without contact. Additionally, this clearance helps some food and/or fluids to slide under the blades 323 to avoid any naked spot on the interior circumference of pot 300. This reduces the likelihood of hot spots that may damage a non-stick coating. Retaining ring 145 has a groove in its outer circumference into which silicone O-ring 330 can be installed. This prevents the escape of fluids at cooking attitudes of pot 300. Retaining ring 145 is installed by first sliding the two fixed clasps 350 over the lip 301 of pot 300 and then fitting adjustable clasp 335 under the rim and tightening it.

Figure 4:
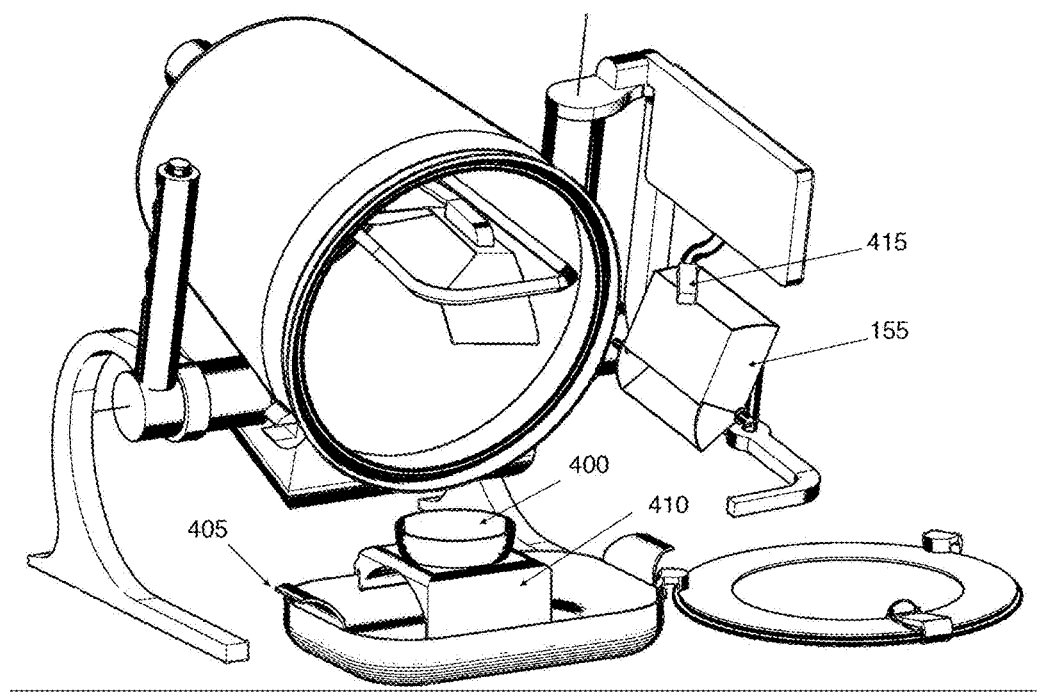
FIG. 4 illustrates the device with the swing arm open and retainer ring removed.

FIG. 4 illustrates the device in the unloading position with the swing arm assembly 150 open, the retainer ring 145 detached and with all parts tilted downward on the base 105. The swing arm assembly pivots around axis 160 and is fastened to swing arm support 227. A number of well-known techniques to do this are known to those practiced in the art and are not described further here. Provision will be made for electrical connections needed to pass through the swing arm assembly 150 through the swing arm support 227 and to the housing extension 115 where additional electronics are located. The swing arm assembly includes the control panel 165, accessory mounts 170, sensor assembly 415 and any mounted accessories such as ingredient bin 155. Electrical connections internal to the swing arm assembly 150 include those to accessory ports 170 and an internal detector that determines when the swing arm assembly 150 is fully closed with its far end fully inserted into receptacle 210.

Figure 5:
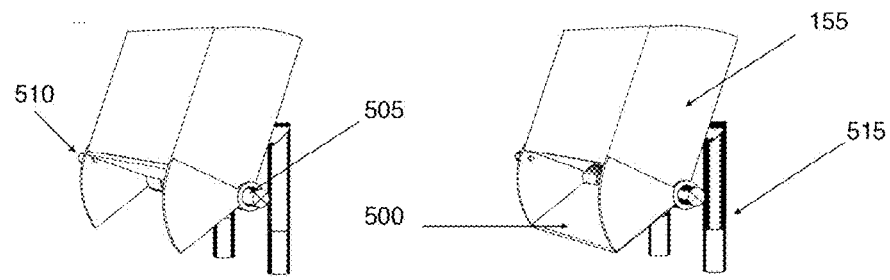
FIG. 5 illustrates the drop bin ingredient dispenser.

FIG. 5 illustrates the ingredient bin accessory 155 showing it in both pre dispense and post dispense configurations. Bin accessory 155 has hinge pin 505 located at its lower back edge which allows drop door 500 to pivot to release contents. Pie shaped extensions on the sides of bin accessory 155 prevent contents from spilling out to the sides. Door release pin 510 uses a solenoid to retract a pin allowing door 500 to drop open when given an electrical signal from the control panel 165. The ingredient bin 155 is constructed so that it can hold fluids without leaking using appropriate materials including extra seals where necessary.

Figure 6:
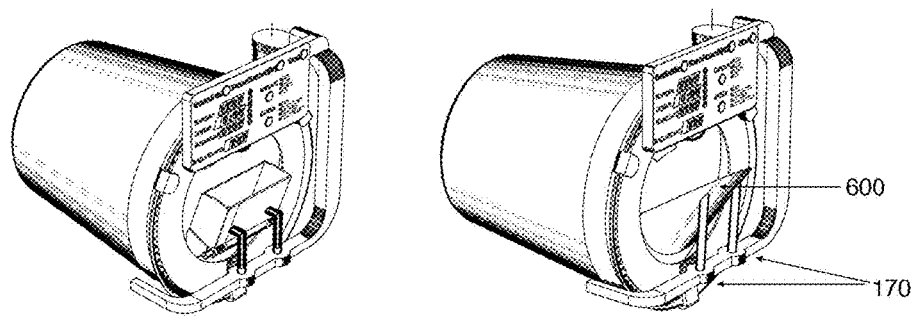
FIG. 6 illustrates an alternative accessory attachment.

FIG. 6 illustrates an alternate accessory installed in accessory ports 170. Loading funnel 600 was installed after ingredient bin 155 supports 515 were lifted from the accessory ports and funnel 600 equivalent parts inserted therein. A range of optional accessories could be installed via accessory ports 170. For example, a mini-blender with the ability to mix ingredients and instantly drop them into pot 300 could be useful for including sauces into the cooking procedure.

Figure 7:
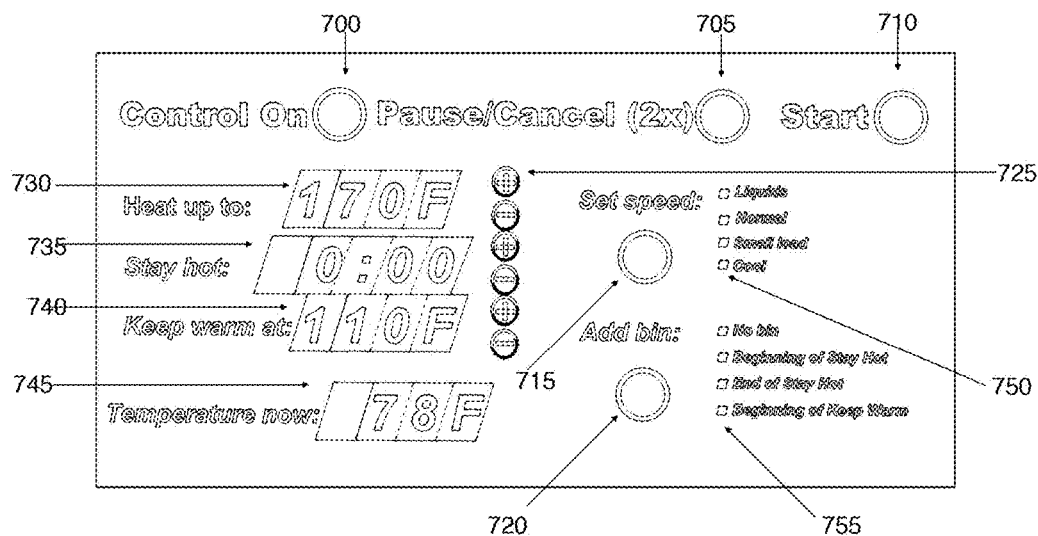
FIG. 7 illustrates the control panel of the device.
Figures 8, 9:
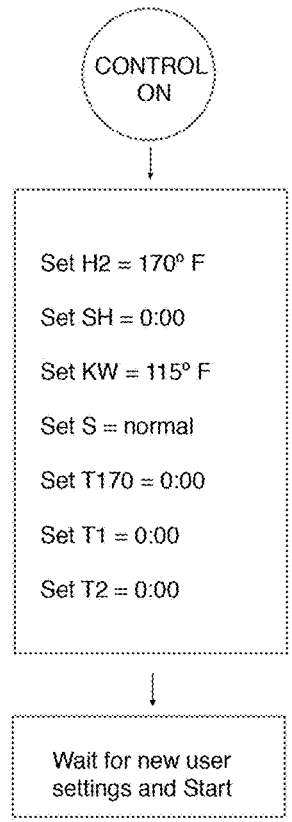
FIG. 8 illustrates the legend for logic diagrams.
FIG. 9 illustrates the initialization procedure for operation.
Figure 10:
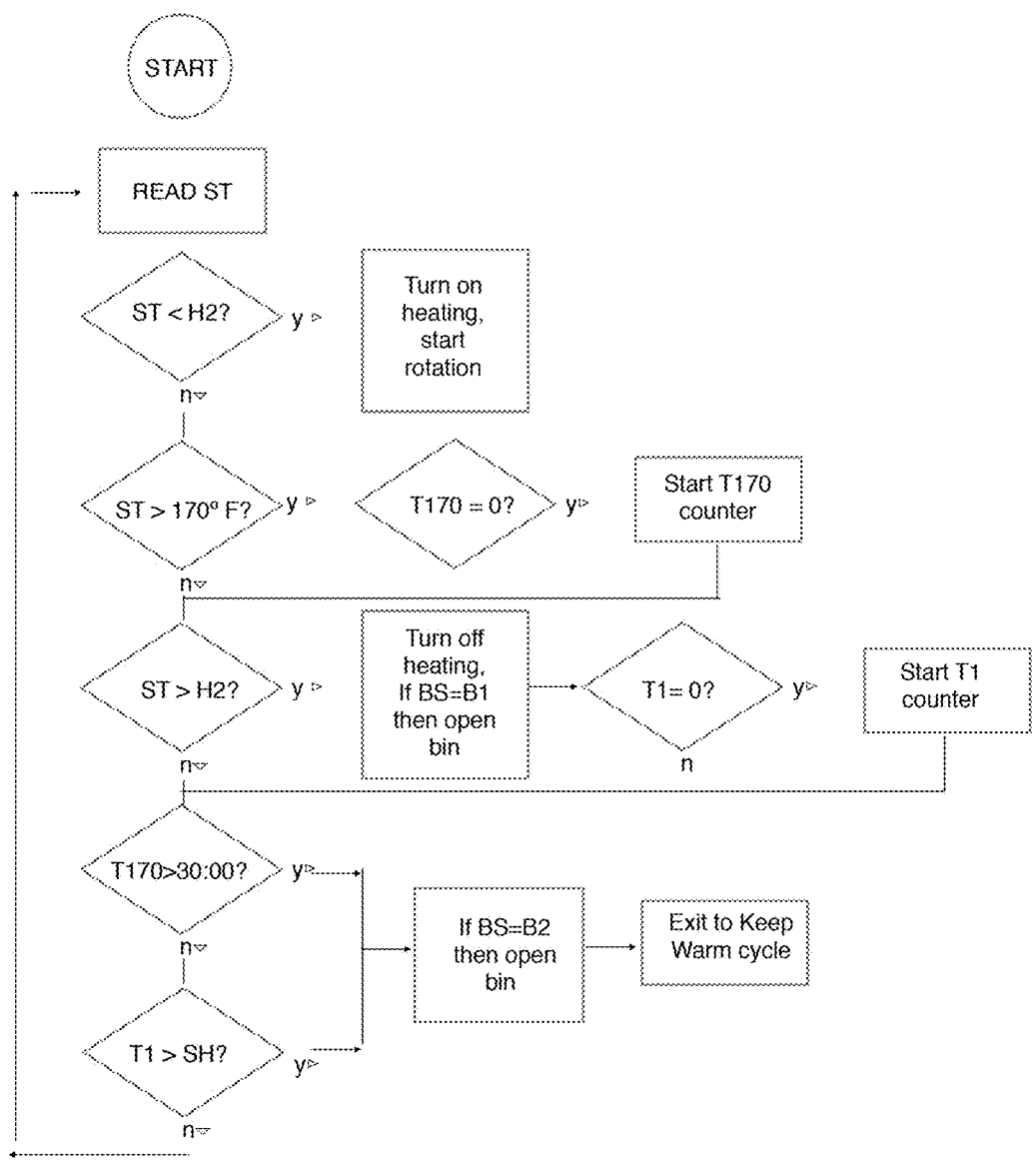
FIG. 10 illustrates the logic for the cooking cycle.
Figure 11:
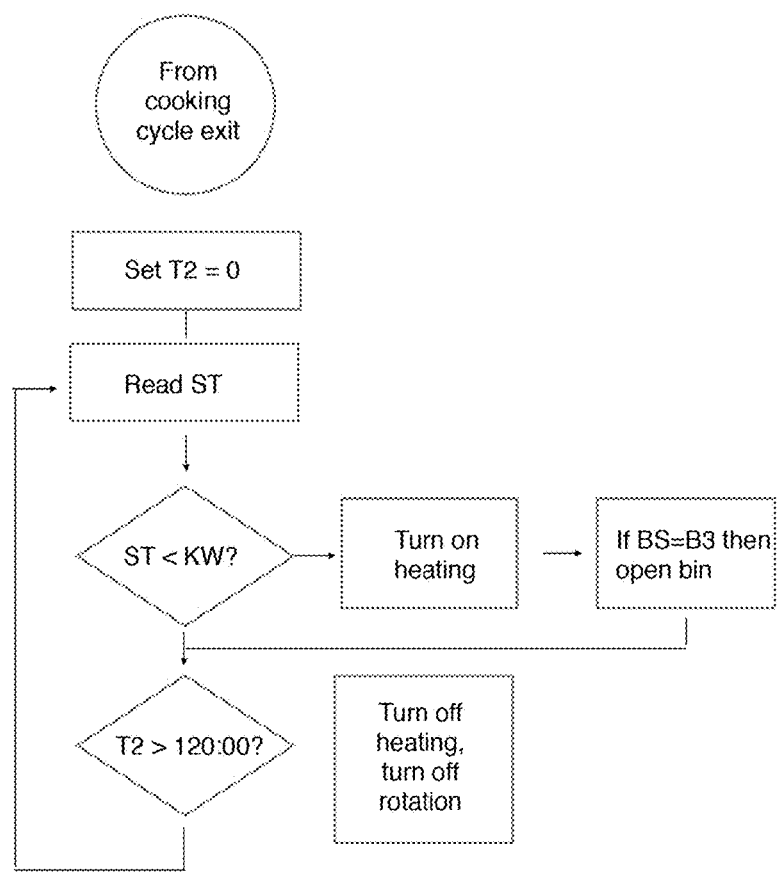
FIG. 11 illustrates the logic for the keep-warm cycle.

FIG. 7 illustrates the control panel 165. Pushing the "Control On" button 700 activates display readouts 730,735, 740,750, 755 causing them to display their default values. "Temperature now" 745 indicates the current sensor reading. The user can then change these values by pushing the appropriate "+" or "−" buttons 725 to change the "heat up to" temperature (730), "Stay Hot" time 735, or "Keep warm" temperature. The "Set speed" button 715 and/or the "Add bin" button 720 can be pushed to rotate to the desired selections indicated by LED indicators 750, 755. After making desired selections, if any, the user can push the start button and cooking commences. This configuration does not allow heating to occur without rotation. This helps protect pots with non-stick coating from damaging hot spots. The "Temperature now" reading does not reflect the actual sensor readings which typically occur every fraction of a second. Instead the readings are accumulated and passed through an algorithm with the goal of displaying the most accurate food temperature. For example, when the tumbler blade scoops up food to expose momentarily a naked area of the cooking surface a spuriously high temperature (that of the cooking surface, not the food) will be generated. The algorithm will remove the influence of these spurious readings and display a more accurate temperature and hold it on the display long enough for the user to be able to read it. This may cause a slight delay in the displayed readings.

FIGS. 8, 9, 10, 11 illustrate how the embedded logic works. This logic accommodates a common situation that might otherwise cause problems. Suppose a user enters a "Heat up to" temperature of 225° F. Then suppose high water content and extended boiling off of water prevents that temperature from being achieved for a very long time resulting in overcooked food. The logic operates a concealed counter that recognizes that food at a temperature of 170° F. or more is rapidly cooking. It allows heating to continue no longer (in the illustration, FIG. 10) than 30 minutes. Both the 170° F. and 30 minute values are arbitrary and the actual values would be determined after experimentation with a production prototype.

Figure 12:
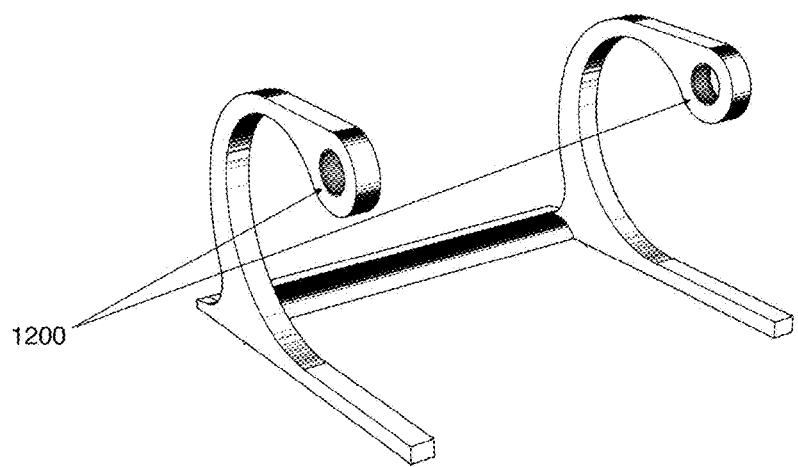
FIG. 12 illustrates separately the non-pivoting base part of the device.

FIG. 12 illustrates the base 105 alone so the apertures 1200 may be illustrated.

Figure 13:
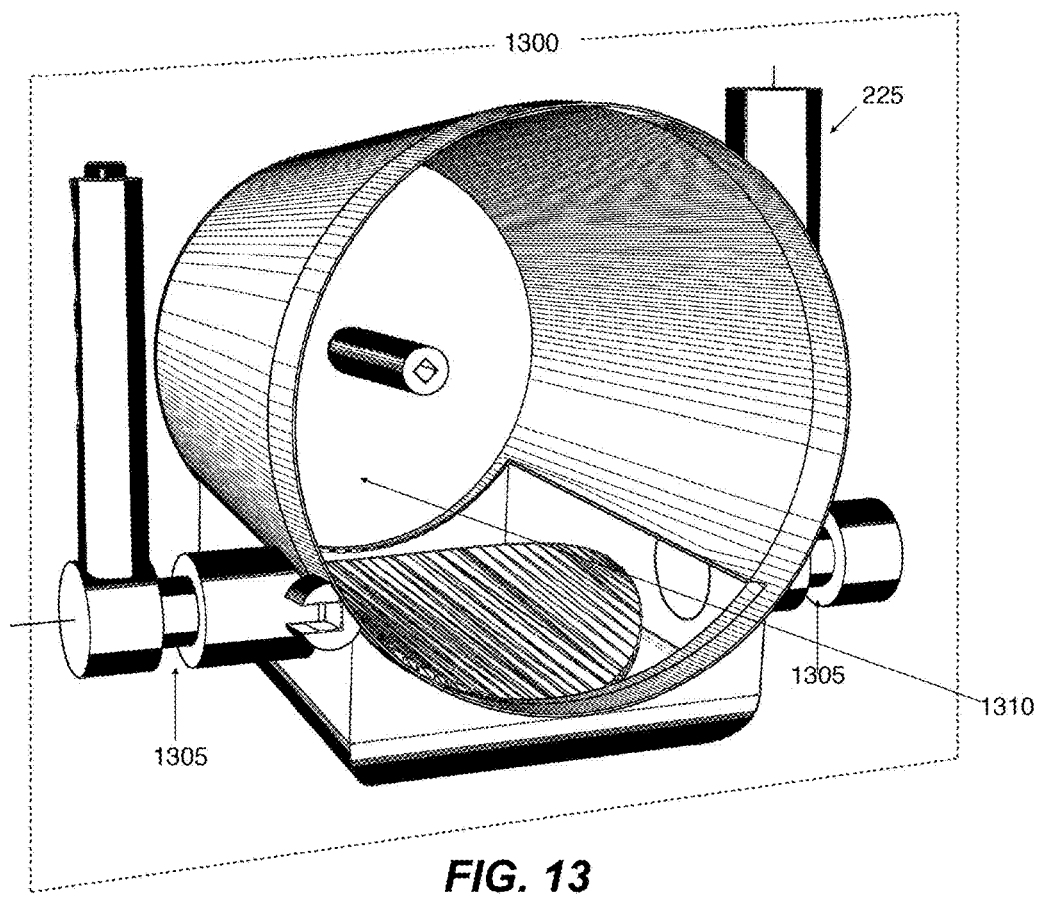
FIG. 13 illustrates separately the housing assembly.

FIG. 13 illustrates the housing assembly separately to better illustrate shafts 1305.

Figure 14:
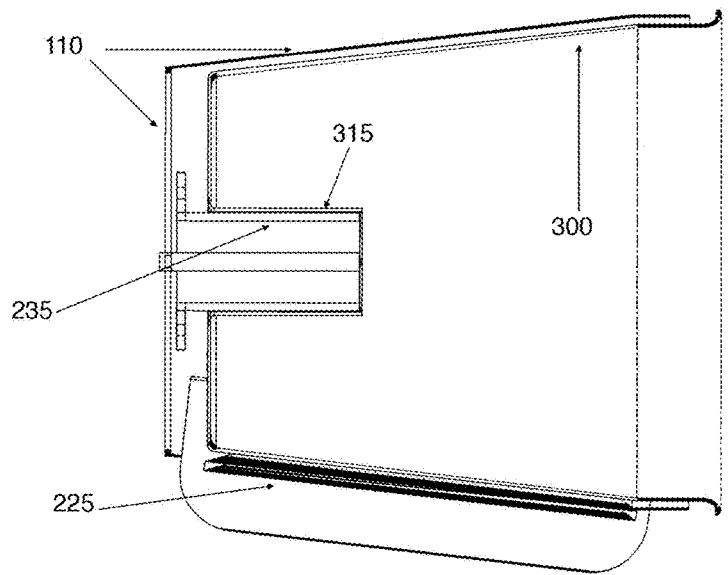
FIG. 14 illustrates a cutaway showing the position pot, heat shroud, and heating element.

FIG. 14 illustrates a cutaway showing the position pot, heat shroud, and heating element.

Figure 15:
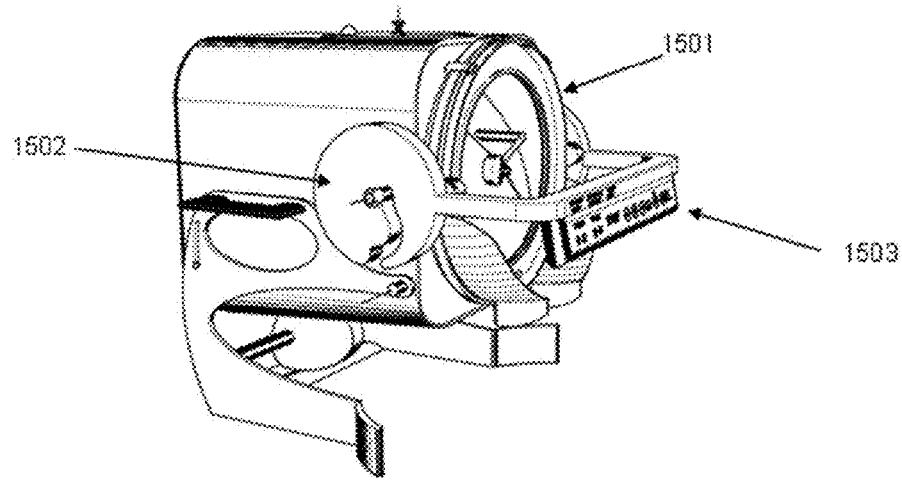
Figure 26:
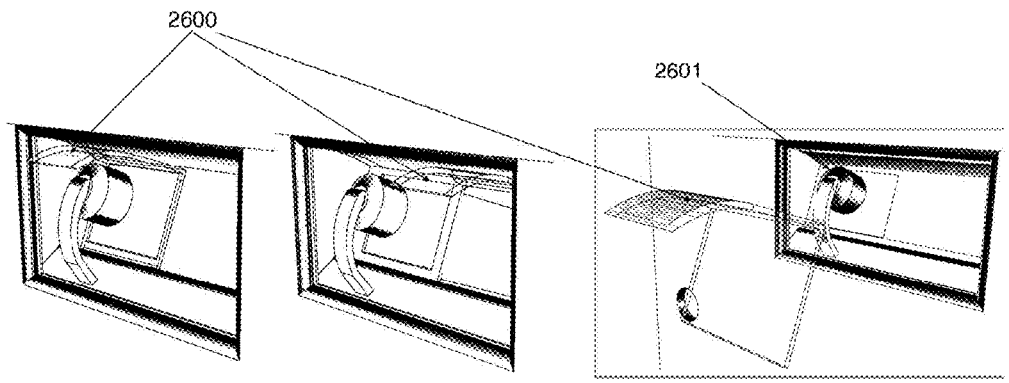

FIG. 15 and all figures through FIG. 26 refer to a second major embodiment of the invention called the "compact" version. This version's cooking method is the same, but it has major physical feature differences. They include:

1. The pot does not rotate: only the blade rotates. The tumbling of the contents behaves nearly identically because the non-stick coating is so slippery.

2. The housing assembly and pot do not tilt up: tilt variation is limited to a 10 degree front down (accomplished by raising the rear of the housing) for draining and unloading.

3. Loading ingredients is accomplished through an opening in the top of the non-rotating pot rather than tilting the pot up and loading through the front.

4. The front lid is sealed by gaskets so a higher level of liquid contents can be loaded, rather than using a tapered design using a front lip to retain a small level of fluids, or requiring the user to install a perimeter gasket which would eliminate he ability to drain off unwanted liquids. Instead, the new lid, which does not rotate, has an openable drain at bottom center.

5. A unique funneled clamshell front lid allows controlled unloading of liquid loads. It operates by moving a handle attached to a cam on either side of the housing. The controls are mounted on the handle.

6. The IR sensor looks through an opening in the side of the pot rather than through the front.

These features are detailed in the figures and following description.

FIG. 15 shows the device in normal cooking position with the front lid 1501 secured by the cam handle assembly 1502 which includes the control panel 1503. More detailed descriptions follow below.

Figure 15A:
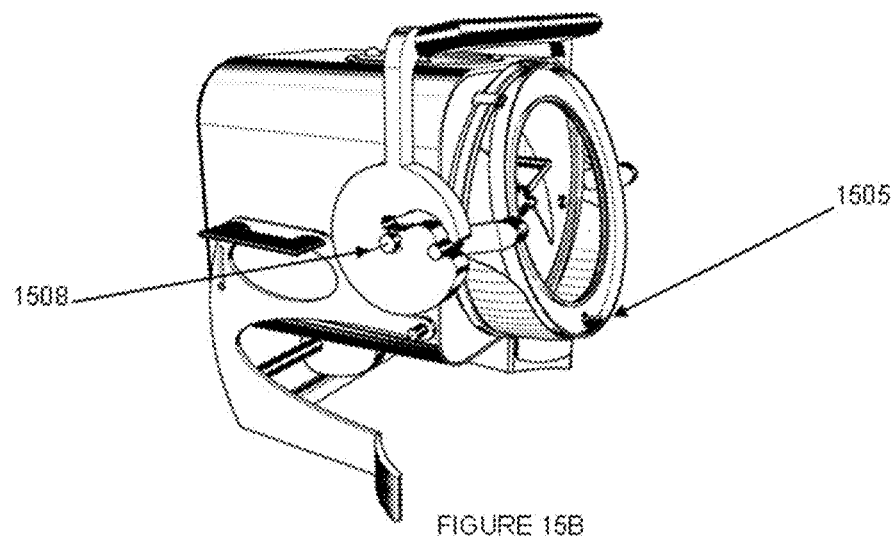
FIG. 15A illustrates a perspective view in unloading position.

FIG. 15A shows the device with the front lid 1501 with its lower edge pivoted out 15 degrees relative to the top edge by action of the upward pivoted cam assembly 1502 about pivot point 1508 so any liquids will drop controllably into a receptacle below after which the front lid 1501 can be removed to unload any remainder.

Figure 15B:
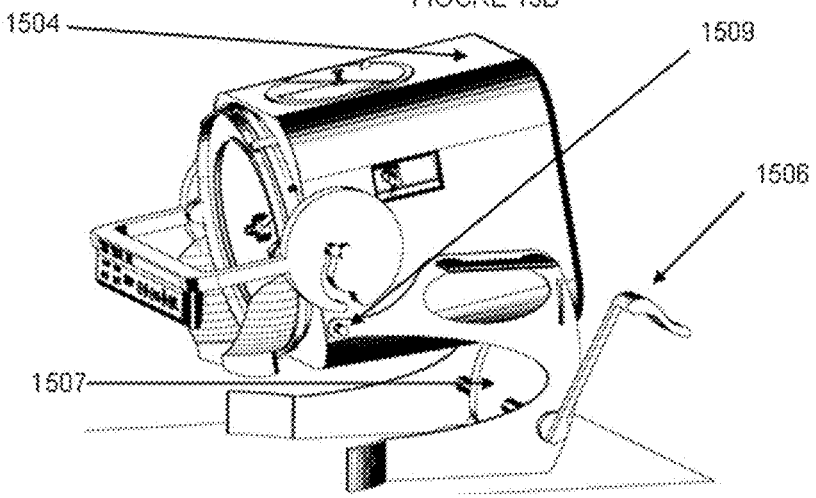
FIG. 15B illustrates a perspective view in draining position.

FIG. 15B shows the rear of the housing 1504 pivoted upward about pivot point and base mounting stubs 1509 to provide a front downward tilt so the lid drain 1505 (detailed below) can be used. Or the lid 1501 can be opened and removed in this position for easy unloading. A tilt lever 1506 is shown here in its rearward position which rotates cam lobe 1507 so that it raises the rear of the housing 1504.

Figure 16:
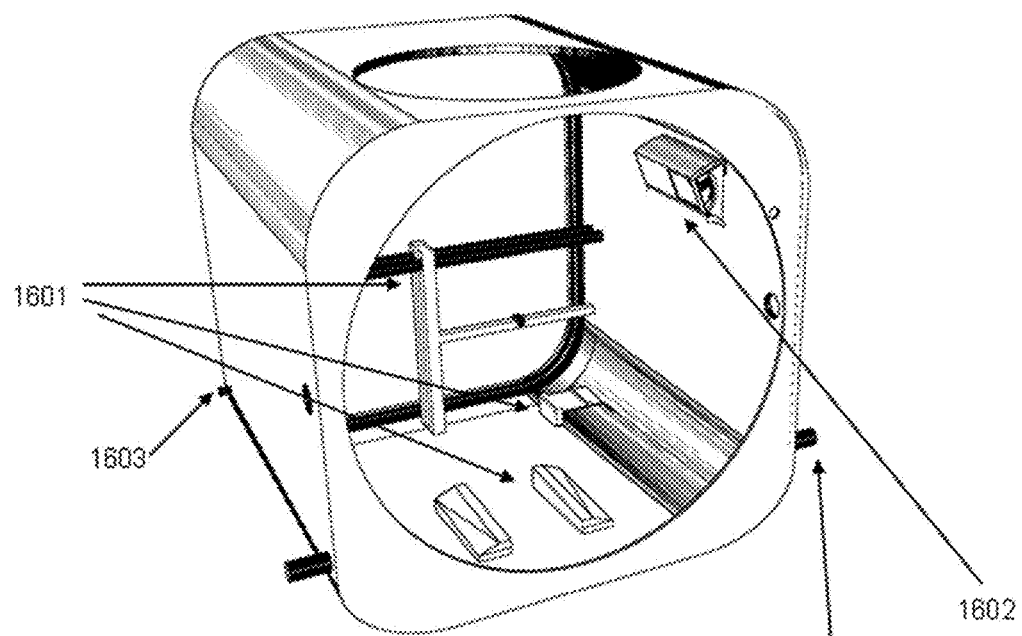
Figure 16A:
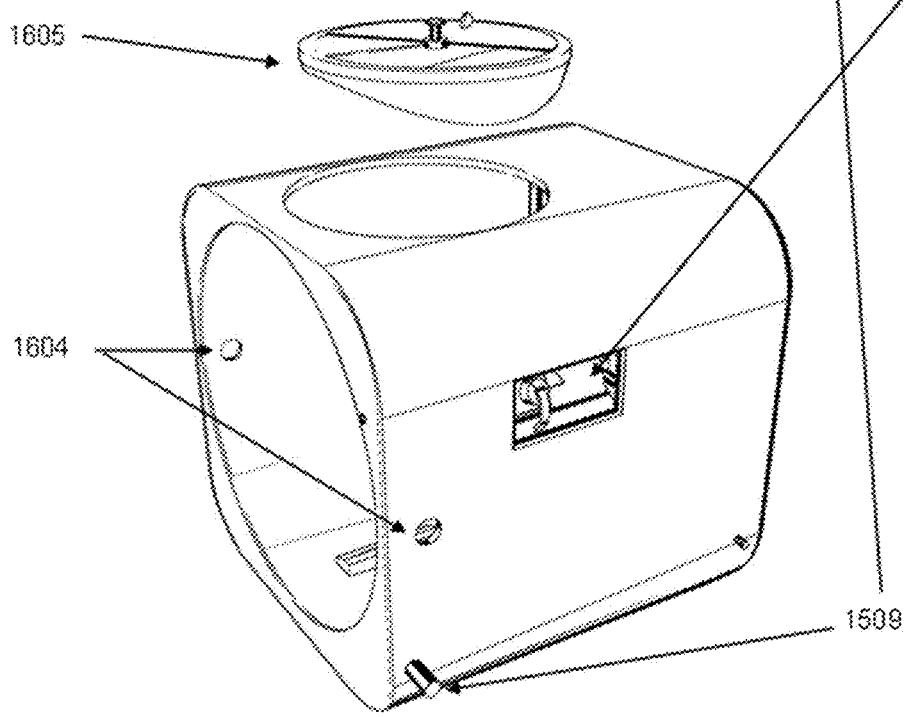

FIGS. 16 and 16A show from two perspectives the naked housing assembly with internal support structures 1601 for components, a sensor mounting indentation 1602, guide stop stubs 1603, and cam assembly (1503) mounting holes and pivot points 1604. Top lid 1605 fits through the opening in top of housing 1504 and rests on the mounted cooking vessel (detailed below).

Figure 16B:
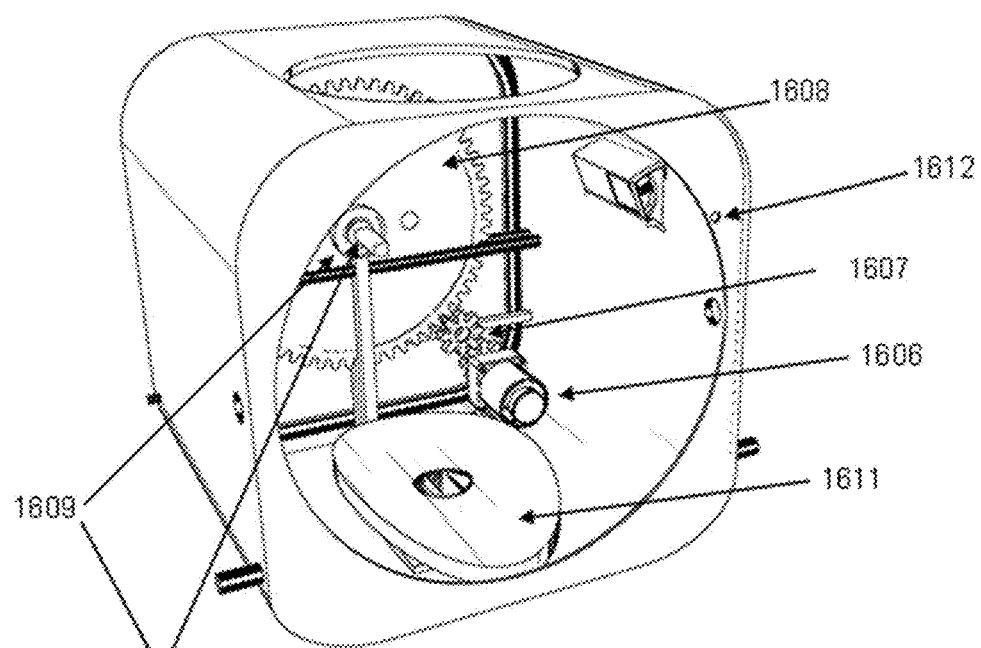
FIG. 16B, 16C illustrate the housing with additional features.
Figure 16C:
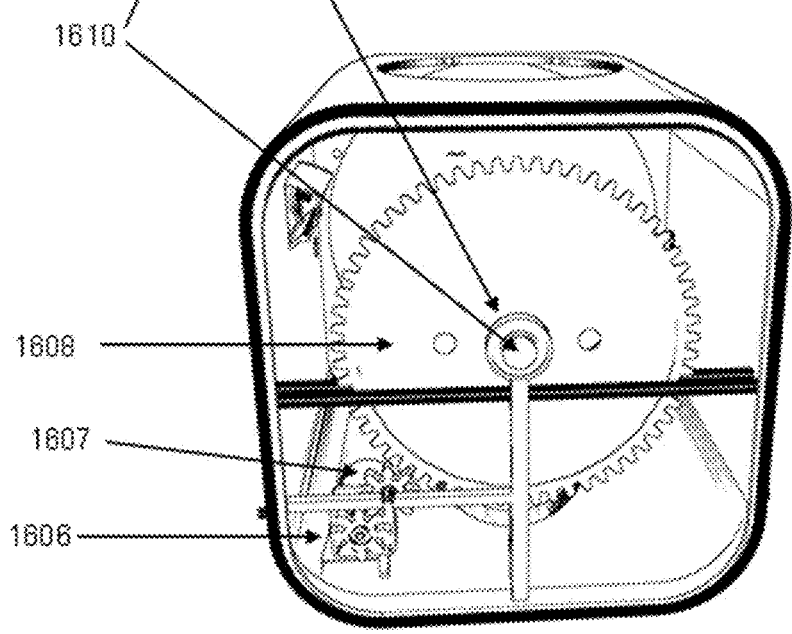

FIGS. 16B and 16C show from two perspectives drive mechanism components including the motor 1606, transfer gear 1607, main drive gear 1608, support bearings 1609, blade drive shaft 1610, and heating element 1611. Note pot alignment hole 1612.

Figure 17:
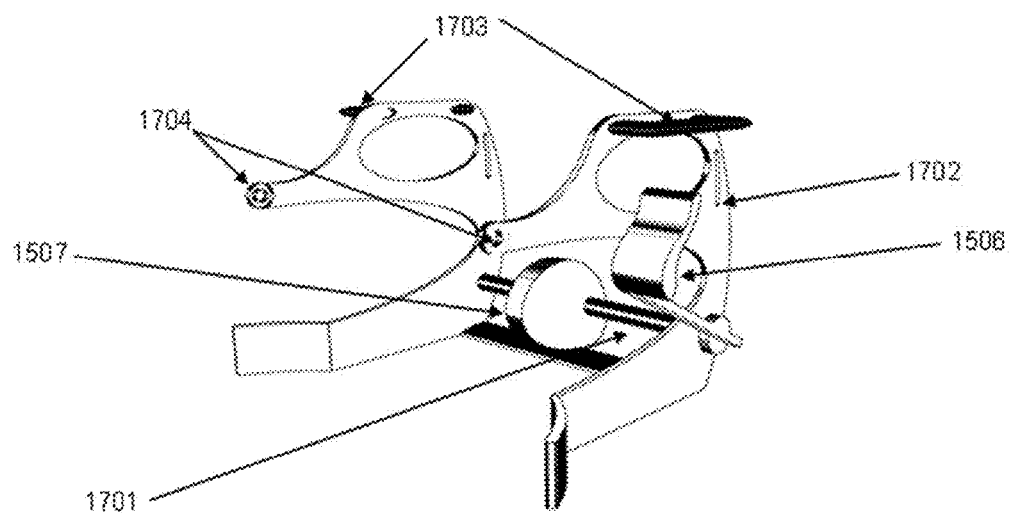

FIG. 17 shows the base tilt lever 1506, here shown in its forward/normal attitude position as opposed to the position in FIG. 15B, the cam lobe 1507 also in its normal attitude position, associated camshaft 1701, housing tilt guide slots 1702, carrying handles 1703, and housing stub (1509) mounting holes 1704.

Figure 18:
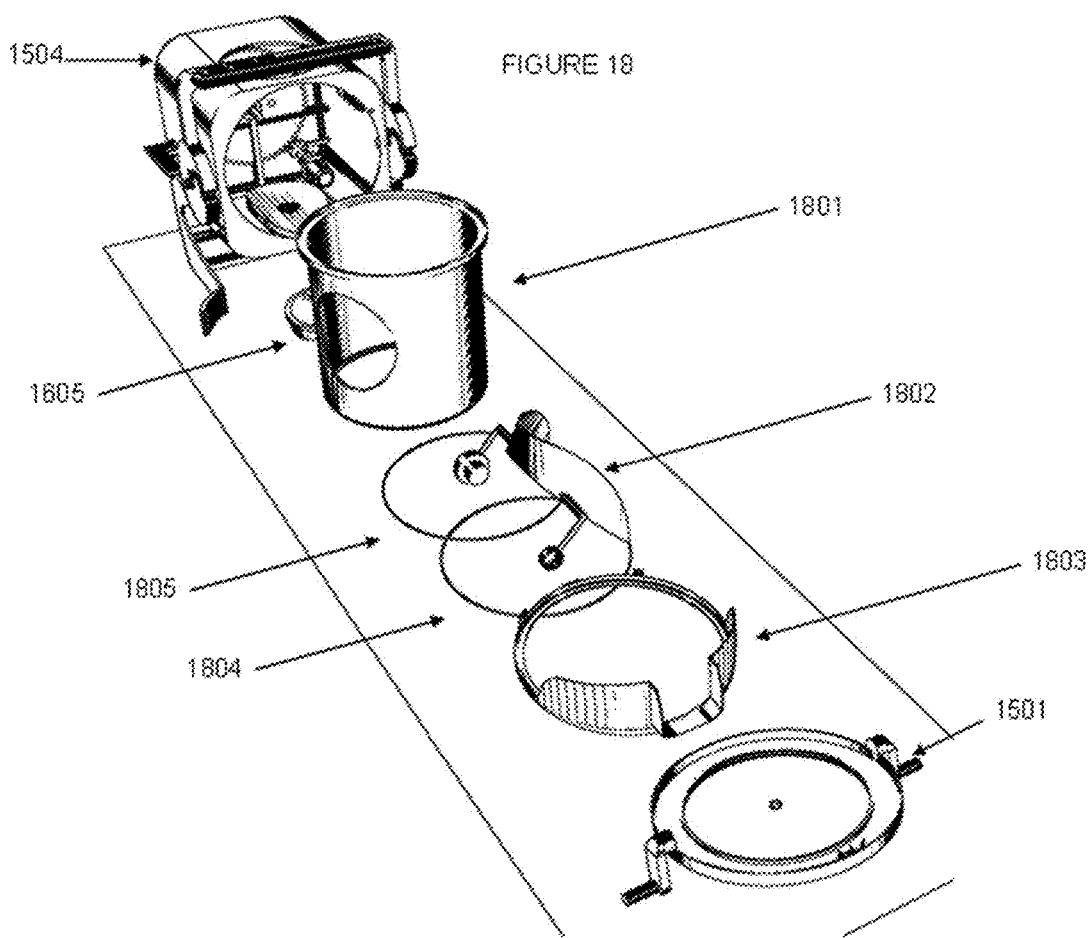

FIG. 18 shows parts that will be assembled into the housing for use. These include the top lid 1605 (partially obscured). main cooking pot 1801, tumbler blade assembly 1802, funnel ring 1803, front lid 1501, and gasket rings 1805 (forward) and 1804 (rear) that insert into slots in the funnel ring 1803.

Figure 19:
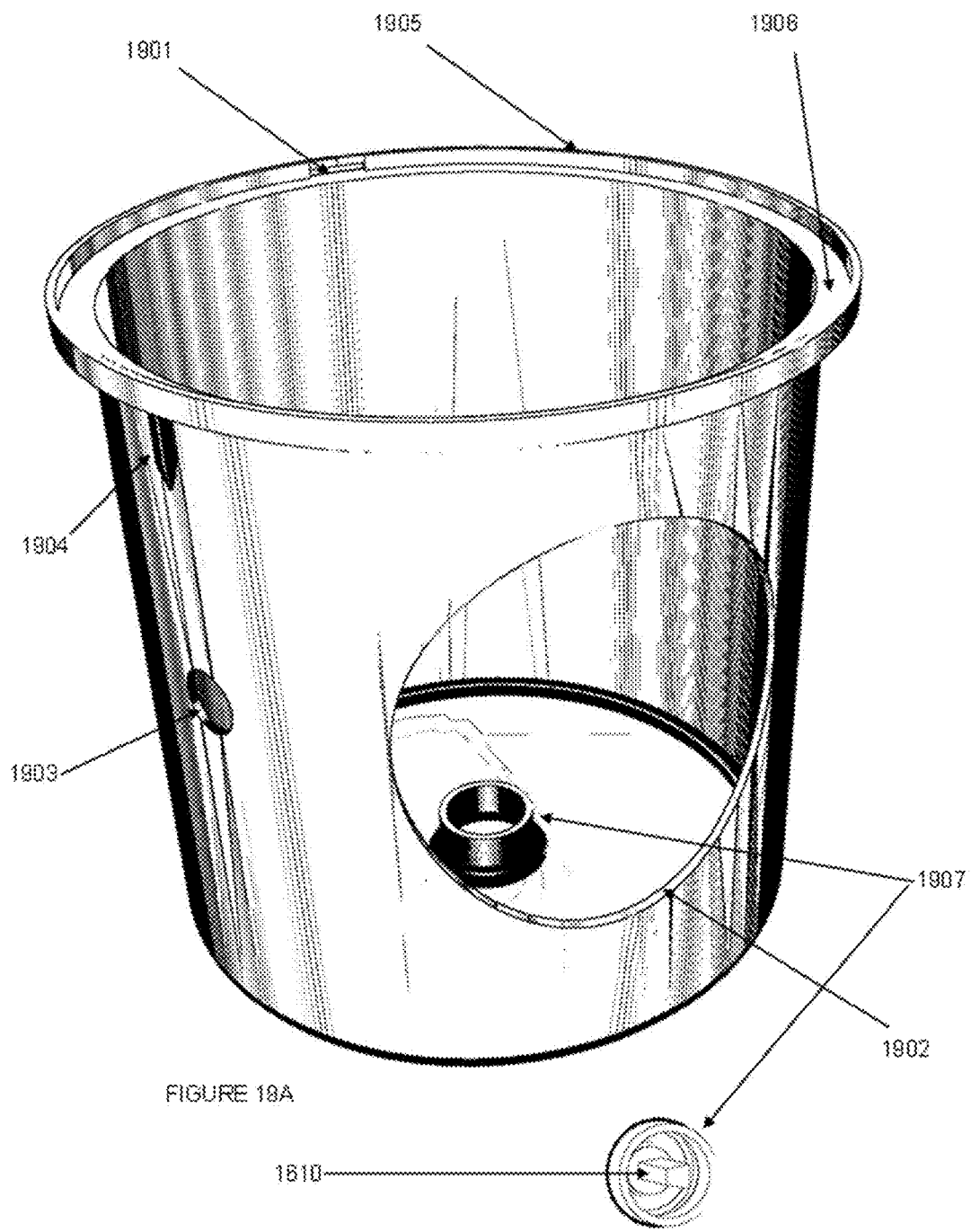

FIG. 19 shows the pot 1801 and its features. This is a perspective illustration—the pot is not tapered. The funnel ring tab slot 1901 is an opening into which a tab on the funnel ring 1803 is inserted during assembly for operation. The top lid opening 1902 is at the top and the tab slot 1901 is at the bottom when the pot is mounted and in position for operation. The sensor looks through sensor window 1903 and alignment stud 1904 restricts the pot from being inserted into housing unless it is positioned to fit through alignment hole 1612. Note tall pot lip 1905 and the wide gasket shelf 1906 that comprise the front circumference of the pot. Drive shaft sleeve 1907 allows pass through for the rotating tumbler blade assembly 1802 and the blade drive shaft 1610.

FIG. 19A shows the position of the blade drive shaft 1610 and drive shaft sleeve 1907 when the pot is installed for operation.

Figure 20:
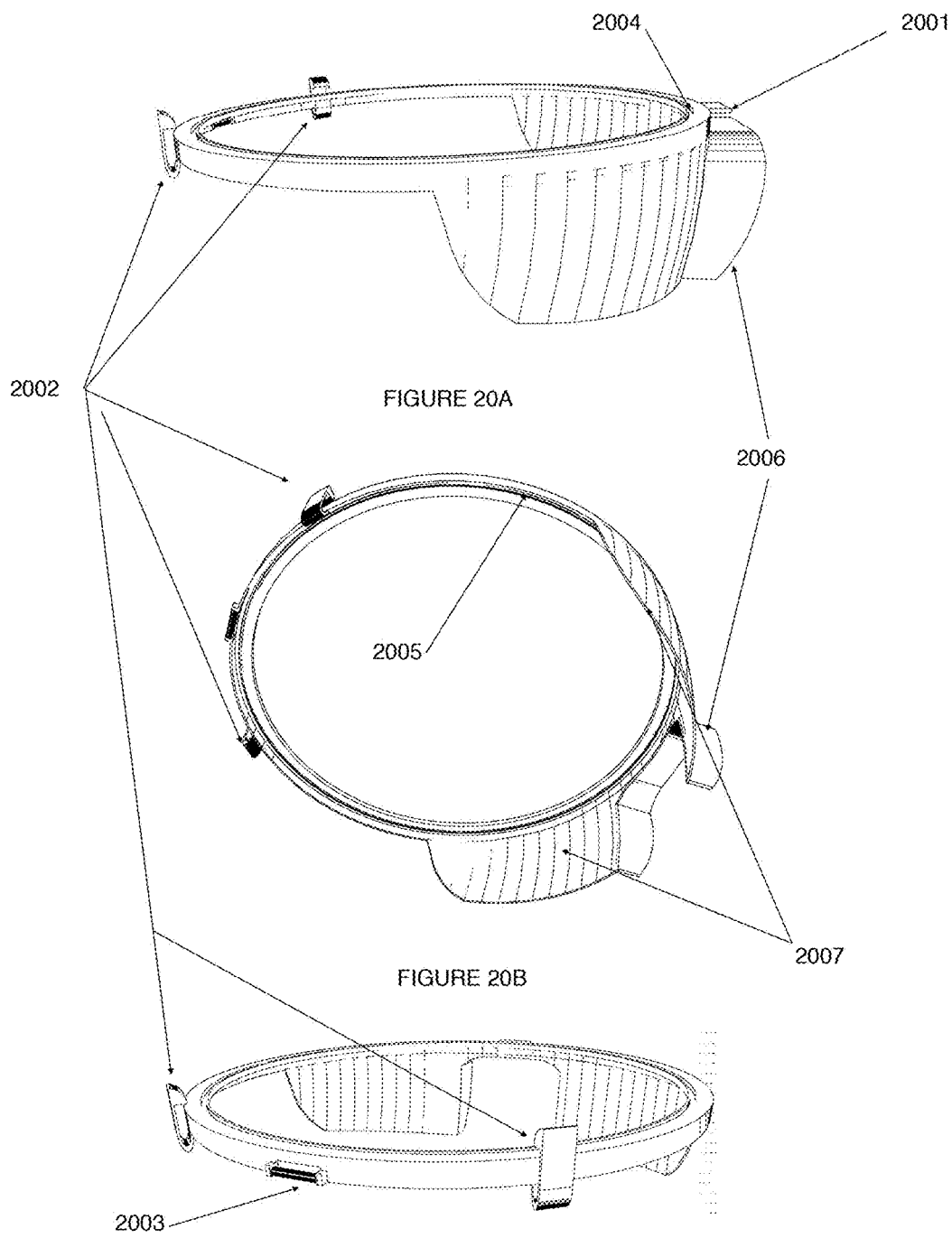

FIGS. 20, 20A, and 20B show alternate views of the funnel ring 1803. Funnel ring tab 2001 is used to mount the funnel ring 1803 to the pot 1801 by inserting it through the funnel ring tab slot 1901. Then flex tabs 2002 are fastened over the tall pot lip 1905 to secure the funnel ring 1803 to the pot 1801. Front lid attachment hinge 2003 will be used to restrain the top of front lid 1501 when it is attached to funnel ring 1803. Gasket grooves 2004 and 2005 allow for insertion of ring gaskets which accomplish a seal between the pot 1801 and the funnel ring 1803 and the front lid 1501. Drip lip 2006 directs fluid flow downward when liquids contents are released from pot 1801 as the bottom of front lid 1501 is pivoted outward from the front lid attachment hinge 2003. Funnel wings 2007 contain liquid contents to the center during release from opening front lid 1501.

FIGS. 21 and 21A show the front lid features including the front lid hinge tab 2100 which engages the front lid attachment hinge 2003 to secure the top of the lid 1501 to the funnel ring 1803 which during use is secured to pot 1801. The cam engagement stems 2101 are forced inward to tighten the lid 1501 when cam assembly 1503 is lowered to the panel down position (FIG. 15). Conversely when the cam assembly 1503 is raised (FIG. 15A), the cam engagement stems are forced outward causing the lid 1501 to pivot about the front lid attachment hinge 2003 and open a gap between the bottom of the lid 1501 and the fuel ring 1803 allowing contents, if liquid, to flow downward contained by the funnel wings 2007 and the drip lip 2006. At the full up position of cam assembly 1503 no longer constrains stems 2101 from further forward movement allowing the lid 1501 to be further pivoted outward around hinge 2003 until tab 2100 can be pulled free from hinge 2003 and the lid 1501 is detached for removal.

FIG. 21B shows how drain 2102 opens by pivoting at the fulcrum 2104 between its handle 2105 and its body exposing drain hole 2107. A small spout 2108 carries fluids out far enough that the fluids can fall clear of all other parts.

FIG. 21C shows the top lid 1605 with its vent in open and closed positions.

Figure 22:
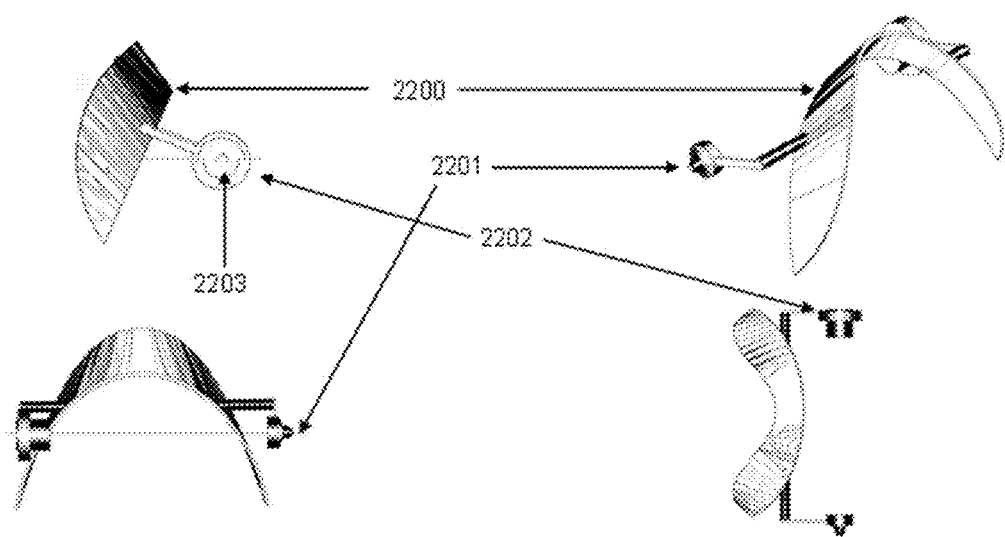

FIG. 22 show the tumbler blade assembly 1802 from several angles: it is a complex shape. The curved blade 2200 is shaped so that as it rotates inside the pot, the center section gathers the central ingredients, then the outsides gather ingredients from the front and rear forcing them atop the central ingredients. With further rotation, the formerly outside ingredients tumble out of the cupped area of the blade first onto the central part of the heated surface. The formerly centered ingredients then fall on top of the pile of just fallen ingredients and fall down the sides of the pile to the outsides. In this way ingredients are mixed not only top to bottom but inside to outside and this results in superior temperature equalization and blending of flavors. The front blade mount 2201 fits through the center hole 2103 which hold its rotational axis in alignment. The rear blade mount 2202 has a trapezoidal inset 2203 so it can slide onto blade drive shaft 1610 by the user during assembly for use.

Figure 23:
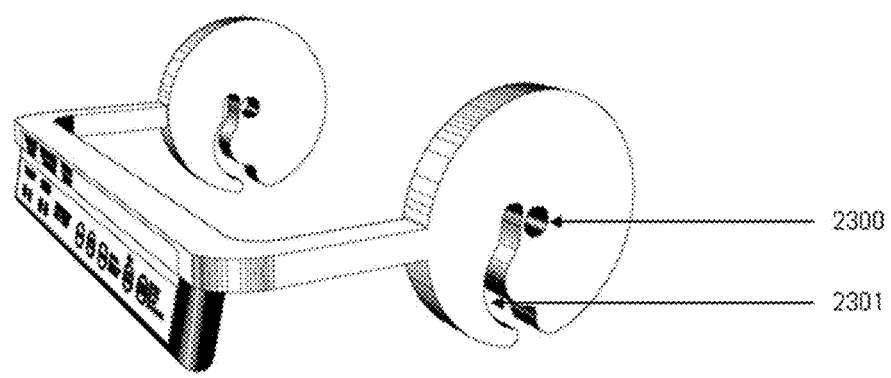

FIG. 23 shows the cam assembly 1503 with its pivot point being at the center of hole 2300. Stem channel 2301 guides the front lid stems 2101 towards or away from the pivot point as the cam is rotated up or down. Since the top of lid 1501 is constrained by hinge 2003, raising the panel on the cam assembly 1503 opens a gap at the bottom of lid 1501 and funnel ring 1803 which allows liquid contents to exit into a receptacle below.

Figure 24:
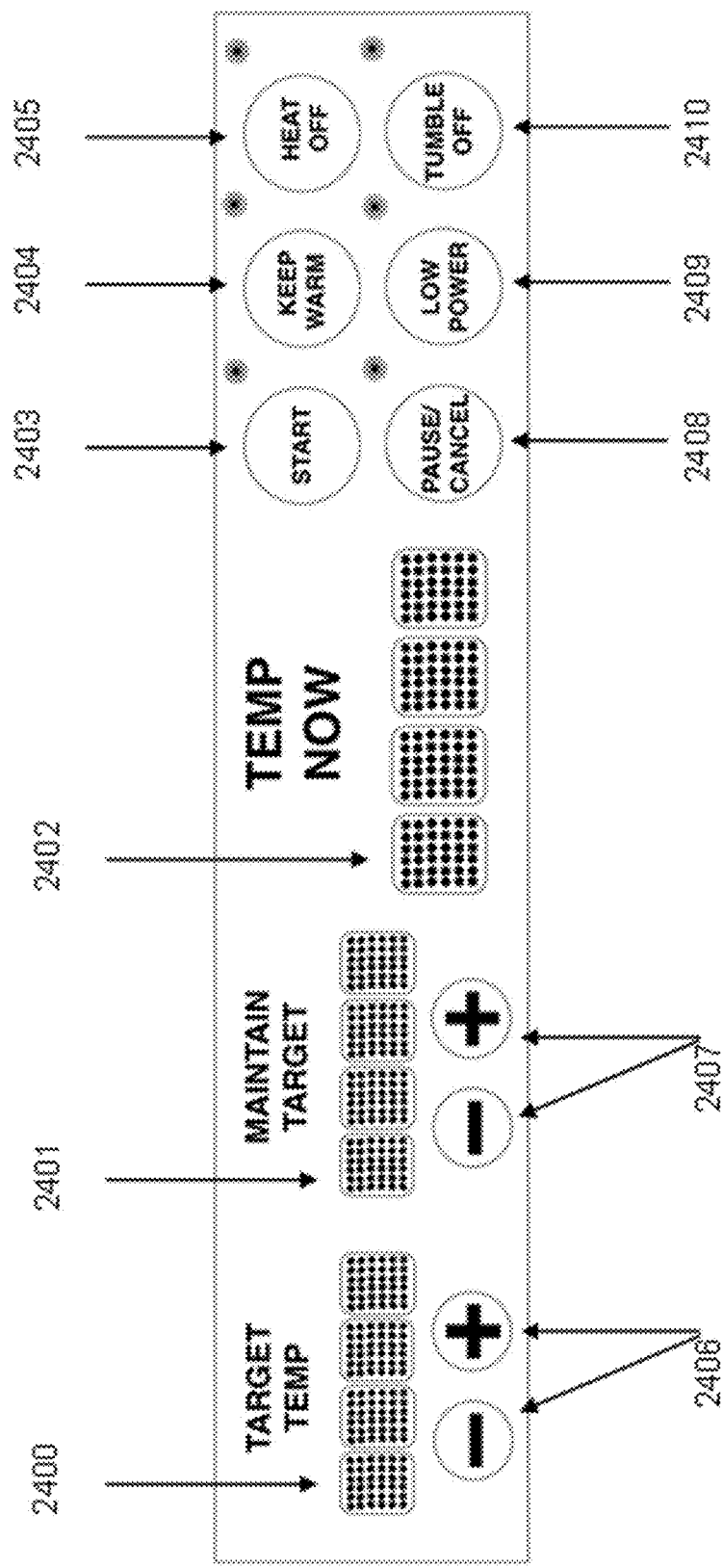

FIG. 24 shows the control panel touch controls. These controls are activated when the cam assembly 1503 is rotated downward into operating position. At that point initial value for TARGET TEMP readout 2400 is set at 165 F and MAINTAIN TARGET readout 2401 time is set at 000 minutes. The TEMP NOW readout 2402 reads the actual sensor reading and all six selector buttons 2403, 2404, 2405, 2408, 2409, 2410 are set to off and their LED indicators are not lit. The user may then make value adjustments using adjusters 2406 and 2407. Any of the six buttons may also be pushed. Pushing the two rightmost buttons for HEAT OFF 2405 and tumble off 2410 will toggle them on and off, but both may not be set to off simultaneously. If the user turns one off and the other is already off, the other will turn back on. When the user has finished any selections, he/she may push START button 2403 to begin an operating session.

Figure 25:
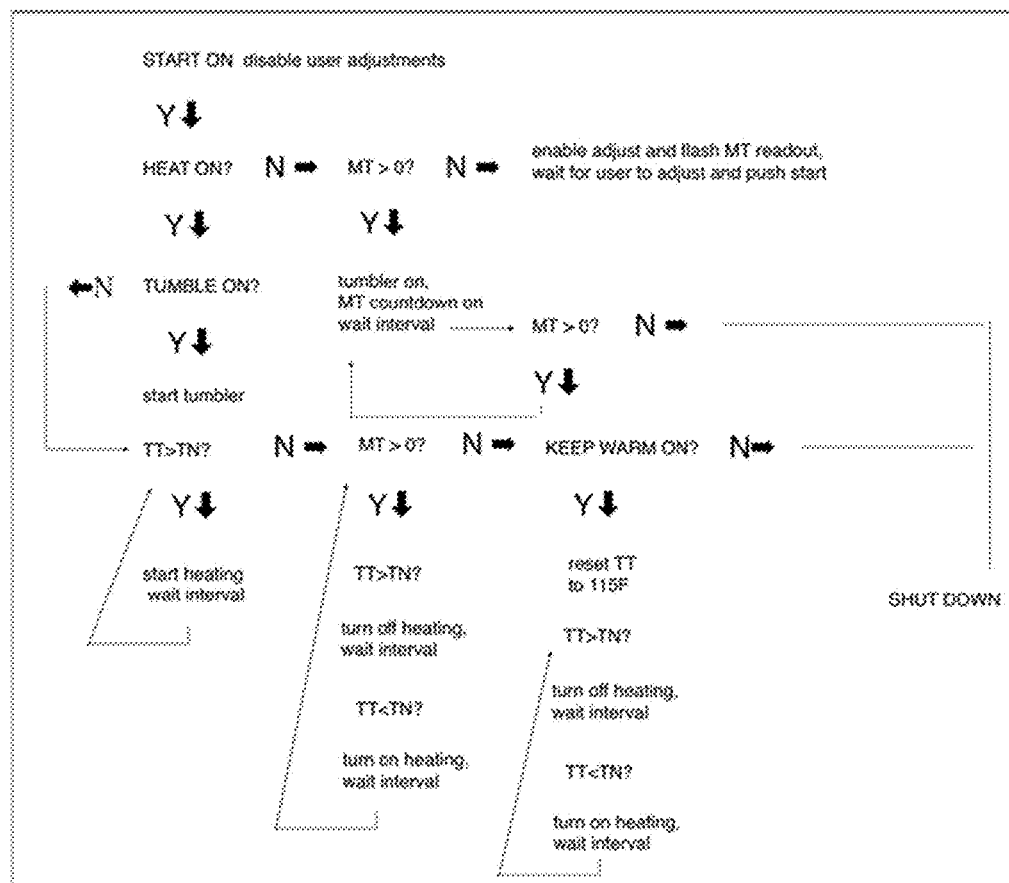

FIG. 25 shows the control logic sequence once the START button 2403 has been pushed and operation has begun. Note that user adjustments are disabled. To make changes, the user must push THE PAUSE/CANCEL button 2408 once to re-enable the controls. Heat and/or tumbling action will stop. After changes, pushing START 2403 will reactivate operation.

FIG. 26 shows the sensor inset 1602 and the position of sensor 2601 and how the sensor splash guard 2600 is removed foe cleaning, if necessary. Splash guard 2600 is moved from in front of the sensor to the right where it can be pulled free and removed.

FIG. 27 through FIG. 37A refer to a third major embodiment of the invention called the "personal" version. This version's cooking method is the same, but it has major physical feature differences. They include:

1. The pot has an attached handle and sits freely on a base containing the heat source.
2. There is no mechanism to tilt the pot.
3. Ingredients exit the pot through the side perimeter, not the front.
4. The pot is not enclosed in a housing.

Figure 27:
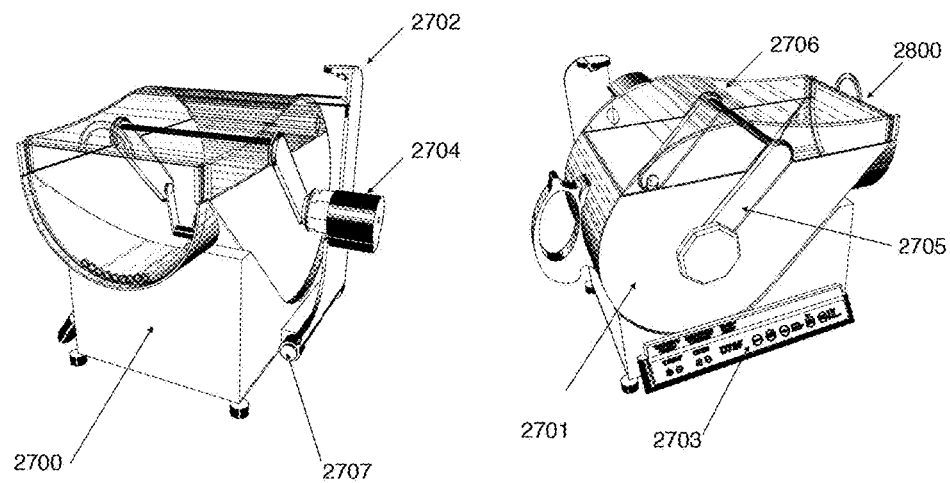

FIG. 27 shows two overviews of the complete device. The major parts are base assembly 2700, pot 2701, sensor arm 2702, control panel 2703, motor 2704, tumbler blade caddy 2705, clear cover 2706, and sensor arm 2702 mounting pivot 2707.

Figure 28:
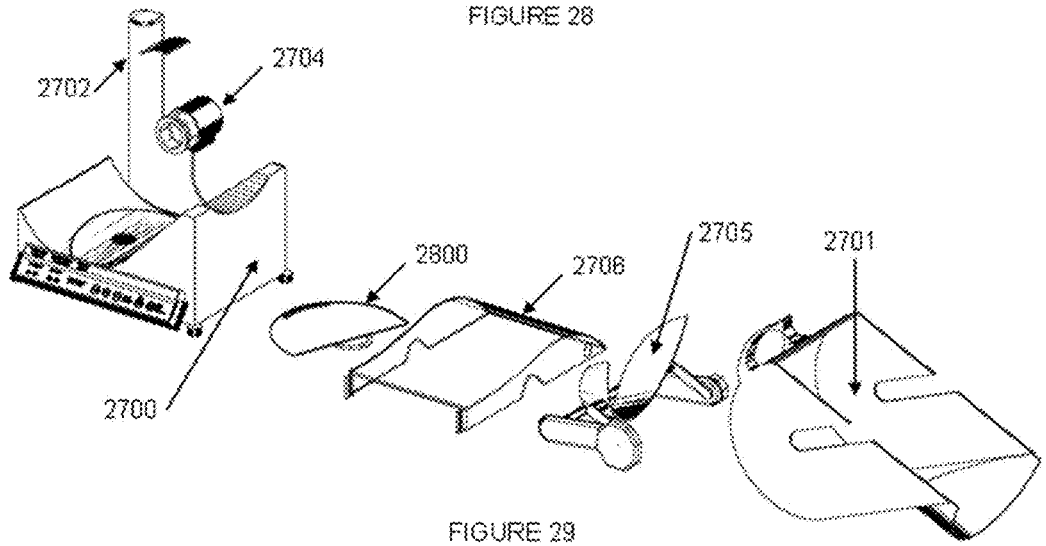

FIG. 28 shows the various parts taken apart as the user would do for cleaning. The base assembly 2700 does not detach from the sensor arm 2702, motor 2704 and control panel 2703. Drain gate 2800 removes from clear cover 2706. Tumbler blade caddy 2705 removes from pot 2701.

Figure 29:
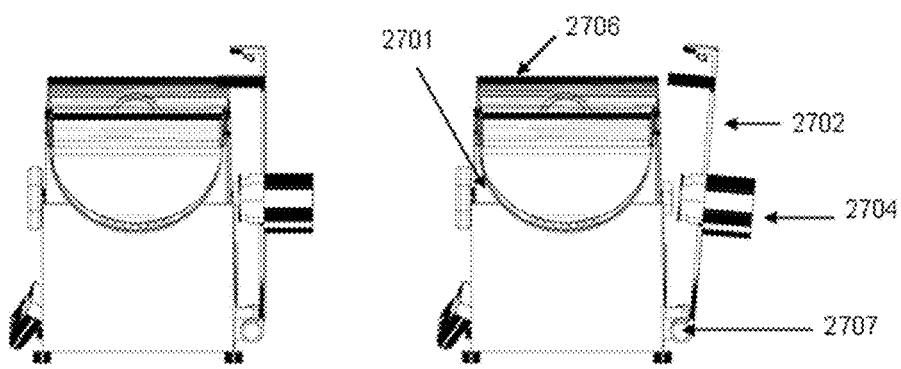
Figure 29A:
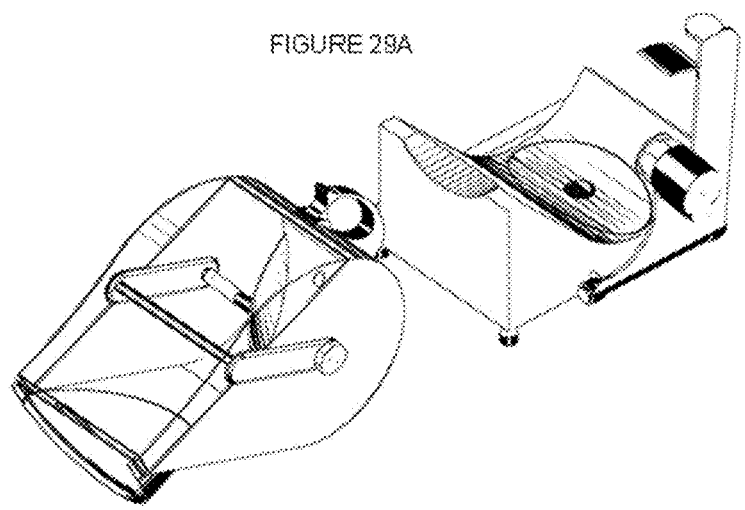
FIG. 29A illustrates separation from base.

FIG. 29 illustrates how sensor arm 2702 rotates out about sensor arm mounting pivot 2707 to allow motor 2704 and sensor arm to clear both pot 2701 and clear cover 2706 so they can be removed by the user. FIG. 29A shows the pot 2701 and the parts attached to it during use moved free and clear from base 2700 and all parts attached to it.

Figure 30:
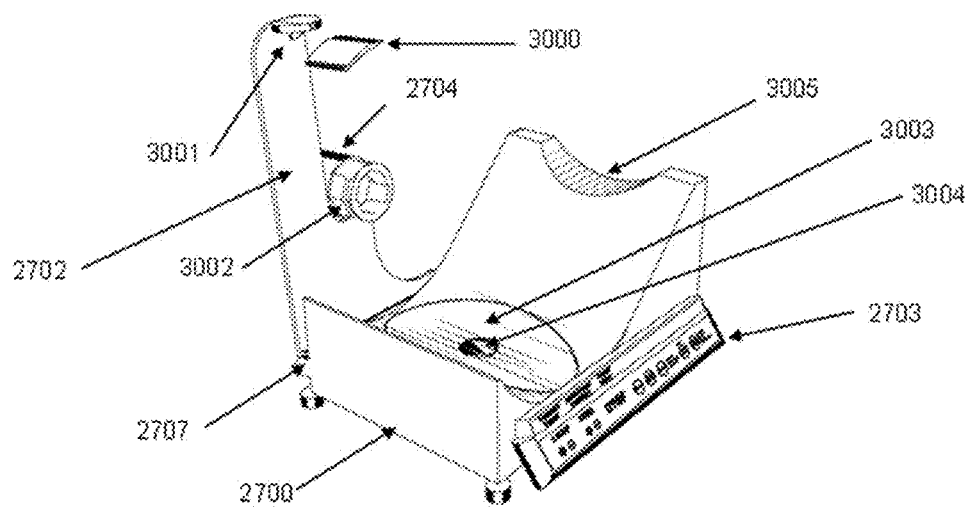

FIG. 30 illustrates the base assembly 2700 and the attached, hinged sensor arm 2702 and their important parts. Sensor arm 2702 is hinged at hinge point 2707 and can travel a range from being upright to a 5 degree recline (shown). Heat source 3003 is located under where the pot 2701 sits and has a shape conforming to the pot 2701 bottom. A spring loaded contact thermostat 3004 is located at the center of the heat source 3003. Pot cradle 3005 is contoured to match the underside of pot 2701. Sensor 3001 is located near the top of arm 2702. Cover retainer 3000 fits snugly over cover 2706 when in place and when swing arm 2702 is in upright closed position. This reminds the user not to try to remove the pot 2701 when the drive collar 3002 on motor 2704 is engaged. When arm 2702 is in reclining (open) position retainer 3000 will be clear of cover 2706 allowing the user to remove it along with pot 2701 upon which it sits.

Figure 31:
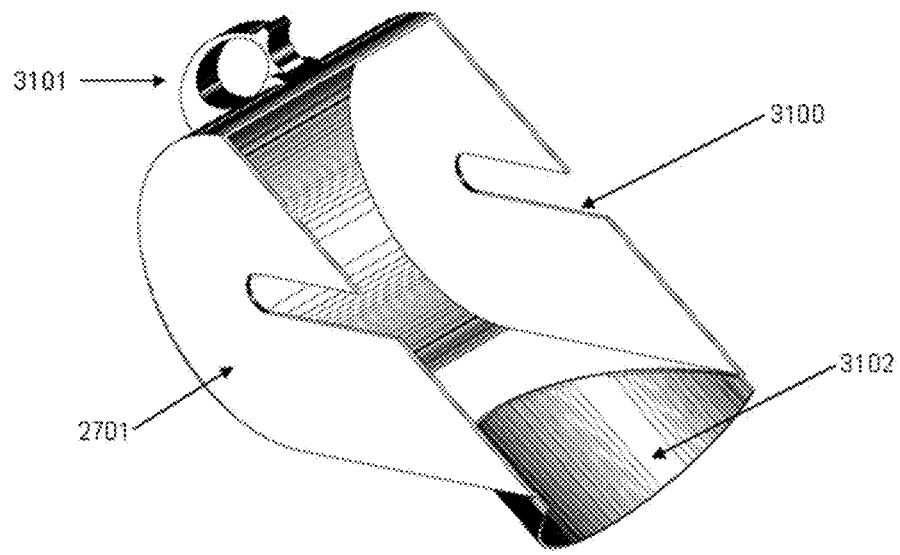

FIG. 31 shows the features of pot 2701. Tumbler blade caddy slots 3100 permit insertion of the tumbler blade caddy assembly 2705. Exit spout 3102 allows the user to remove cooked ingredients by tilting the pot 2701 front downward holding the pot by gripping handle 3101.

Figure 32:
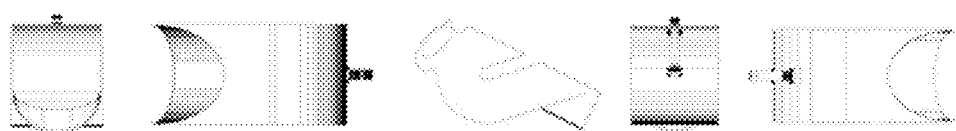

FIG. 32 shows orthographic views of the pot 2701: l to r: front, bottom, side, back, top.

Figure 33:
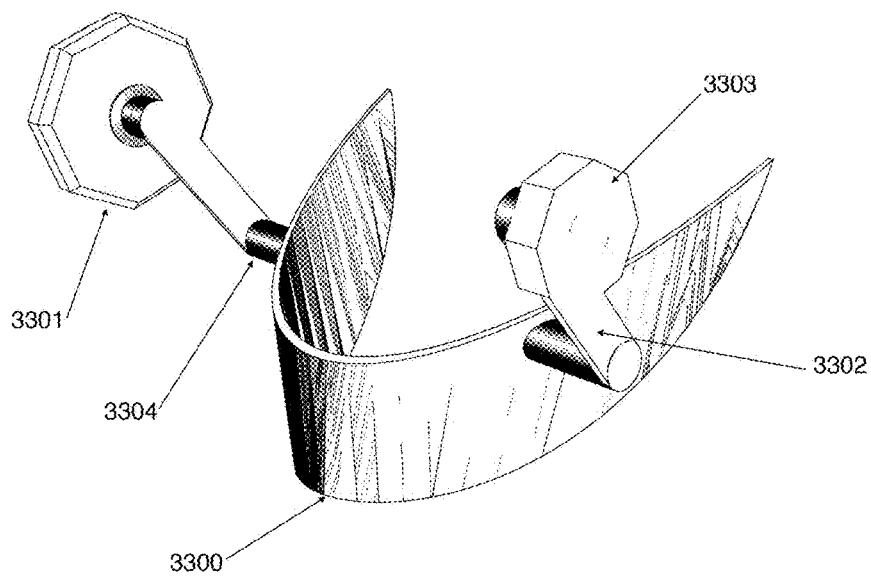

FIG. 33 shows some parts of the tumbler blade assembly 2705 including the tumbler blade 3300, user blade position adjust knob 3301, connecting arms 3302, connecting shafts 3304, and drive hub 3303 over which drive collar 3002 fits when sensor arm 2702 is closed (brought to upright position).

In the "personal" embodiment the control panel 2703 and the control logic are identical to that of the "compact" embodiment. That control panel and logic are shown in FIGS. 24 & 25.

Figure 34:
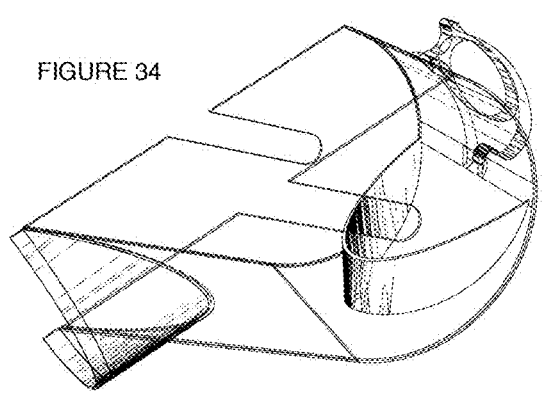

FIG. 34 shows only the blade 3300 in its position as seen through the outline of pot 2701. As the blade rotates (counterclockwise from this view) note that its sides gather together the outlying ingredients so they will be forced on top of the central ingredients in the central cupped area of the blade. This will cause the ingredients from the outsides to fall first into a pile at the bottom center of the pot followed by the central ingredients which will fall down the sides of the pile to the outsides. This achieves a substantial degree of inside to outside mixing which results in superior temperature equalization.

Figure 35A:
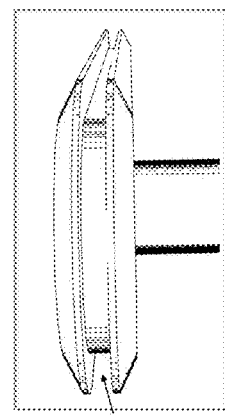
FIG. 35A illustrates detail of the tumble blade assembly.
Figure 35:
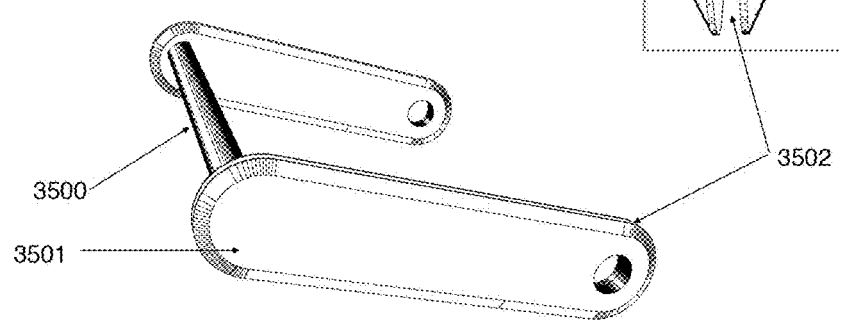

FIG. 35 shows the caddy 3501, also a part of tumbler blade caddy assembly 2705. Handle 3500 provides the user with a way to grip the assembly for installation and removal into/from tumbler blade caddy slots 3100.

FIG. 35A shows groove 3502 which fits tightly into slots 3100 for a secure fit.

Figure 35B:
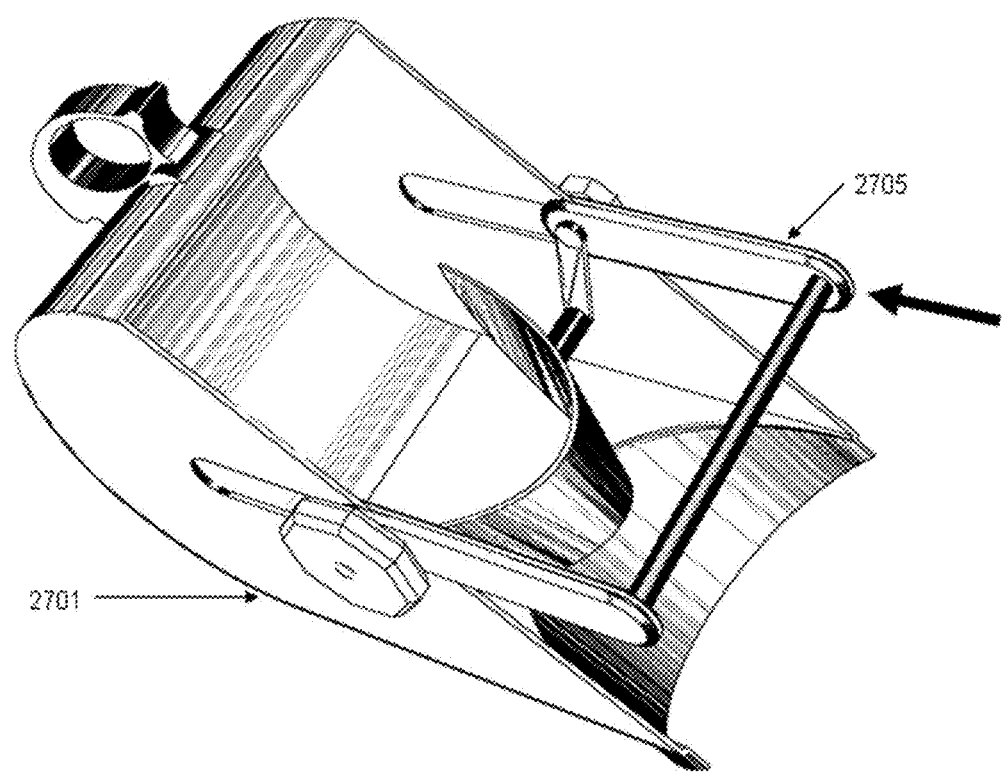
FIG. 35B illustrates installation of the tumbler blade assembly.

FIG. 35B shows the direction of insertion of the complete tumbler blade assembly 2705 into pot 2701.

Figure 36:
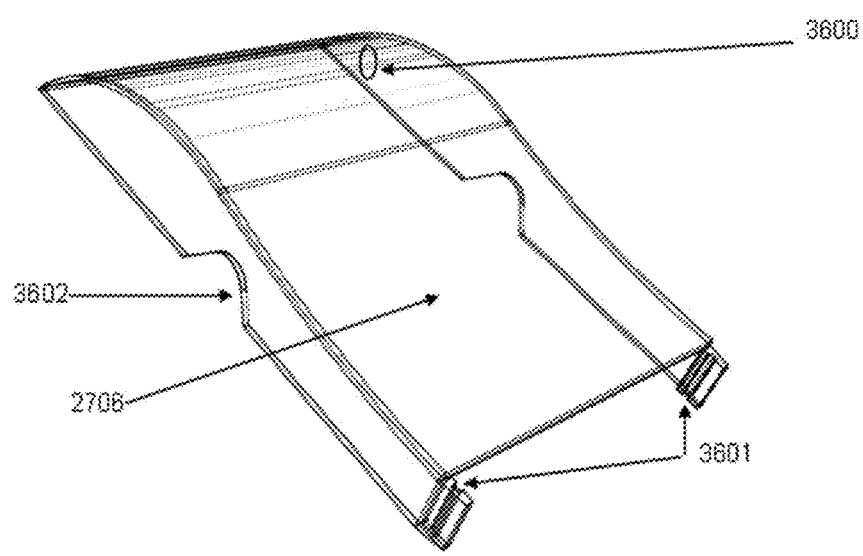

FIG. 36 shows the cover 2706 which is made of a clear material. Sensor look through hole 3600 allows the sensor when in position to look through to and measure temperature of the contents. Indents 3602 are shaped to fit into the grooves 3502 at the top of caddy 3501 and serve to hold cover 2706 in place. Drain gate slots 3601 allow for the drain gate 2800 to be installed and secured after it slides down into place vertically.

FIG. 36A shows detail of how cover 2706 fits into grooves 3502.

FIG. 36B shows drain gate 2800 installed in cover 2706. Drain holes 3603 allow liquids to exit through the drain gate 2800.

FIGS. 37 and 37A show the coupling of the drive hub 3303 which is part of the tumbler blade assembly 2705, with drive collar 3002 when sensor arm 2702 is closed (moved from its reclined to its upright position).

Embodiments of the invention may be appropriate for cooking a large selection of foods but may be best for cooking foods/ingredients of certain characteristics. First, to take advantage of the method food ingredients should be no larger than bite size—what one can put on one fork and eat gracefully. This assures that all particles will tumble freely so that heat transference will maximize temperature uniformity. There is a wide variety of fresh and frozen foods available pre-cut to bite size, and fresh whole foods can be and should be prepped similarly for use in this invention. If food particles are larger, and they should not be much larger, all food particles should be of uniform size to avoid the overcooking of the smaller pieces.

In most instances of cooking non-liquid foods the invention will perform best when cooking oil is used. Oil is a vehicle for both heat transfer and flavor. Oil plays an essential role in increasing the transfer of heat from the cooking surface to the food resulting in faster cooking and reducing the risk of damage from hot spots.

Figure 1A:
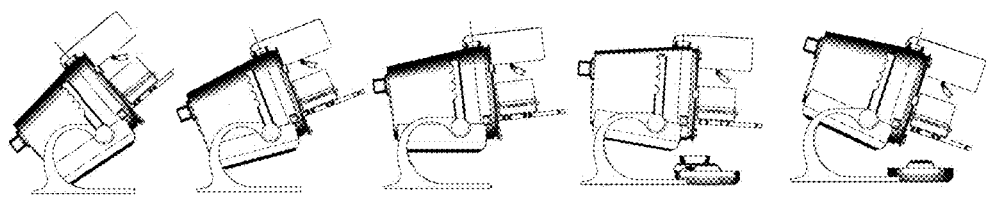
FIG. 1A illustrates various tilted positions of the device.

With the partially tapered embodiment, to load food into the machine, the user first grasps the grip handle 125, presses the lock release button 130 and tilts the entire pivoting assembly back to the leftmost position illustrated in FIG. 1A. Then the tumbler blade assembly 320 can be installed by placing it over the pot inset 315. The squeegee 325 may then also be installed, if desired, into accessory port 215. Food (including oil and flavorings) may then be placed into the pot 300 or the retainer ring 145 may be first installed if the inside circumference of the retainer ring 145 provides a sufficient opening for loading the food being cooked. The grip handle 125 and lock release button 130 are then re-engaged to bring the pot 300 to its normal cooking position where the bottom of the tapered section 340 is level front to back as illustrated in the center position of FIG. 1A. If the user does not wish to use the ingredient bin 155 the user is now ready to start the cooking process by engaging the Control On button 700, changing control panel settings, if any, and engaging the Start button 710. Unless the food being cooked will need to have fluid drained during cooking the rest of the cooking process is automatic. The pot 300 continues to rotate, the temperature of the food is heated to the designated temperature, kept hot for the designated time, and allowed to cool to the designated keep warm temperature and maintained there for up to two hours or until served. To unload the food the user can push the Pause button 705 twice to turn off heat and rotation. Then the user tilts the mechanism back up to the original loading attitude to remove the retainer ring 145. A container or dish can then be placed as illustrated in FIG. 4 under the pot 300 and the mechanism is again tilted downward to the rightmost position shown in FIG. 1A for unloading. After unloading the pot 300 can be allowed to cool and be tilted up again to remove the installed parts. Once cooled the pot 300 may be grasped under the pot rim 301 and pulled from the assembly for cleaning. The pot 300 should not be installed or removed except when empty.

To cook liquid foods the procedure is the same except that the O-ring edge seal 330 is installed around the perimeter of retainer ring 145 before it is attached to the pot 300. If the volume of liquid contents is so great that it would spill over the inner circumference of retainer ring 145 the pot 300 can be tilted further back to the position illustrated second from left in FIG. 1A.

To drain fluids during cooking when the retainer ring 145 is not installed, the user should hit the Pause button 705 and tilt the pot down to the position illustrated second from right in FIG. 1A. Then the pot 300 can be returned to cooking position and cooking will resume after the Start button 710 is pushed.

To use the ingredient bin 155 the user must install it by placing the ingredient bin supports 515 into swing arm accessory ports 170 after other food has been loaded and retainer ring 145 has been attached. The add bin selection 755 may be made by pushing the Add Bin button 720 until the desired selection's accompanying LED indicator is lit. This should be done after the Control On button 700 is pushed and before the Start button 710 is pushed.

With the compact embodiment, the user should assemble parts as shown in FIG. 15. First insert the pot 1801 into the housing. Align stud 1904 with alignment hole 1612 to allow the pot 1801 to be fully inserted. Make sure gaskets 1805 and 1804 have been installed into grooves 2004 and 2005 in the funnel ring 1803. Then install funnel ring 1803 by inserting its tab 2001 through pot tab slot 1901, then fitting the funnel ring 1803 against gasket shelf 1906 making sure flex tabs 2002 have snapped over pot rim 1905. With the pot 1801 and funnel ring 1803 installed the tumbler blade assembly 1802 can be installed by fitting front blade mount 2201 through the center hole 2103 in front lid 1501 as it is installed by inserting lid tab 2100 into funnel ring hinge 2003. Lowering the cam assembly 1502 will cause the front lid to rotate closed. If need be, guide front blade mount 2201 by lifting off top lid 1605 and reaching through the top opening of pot 1801 so that it fits through the front lid center hole 2103 as the cam assembly 1502 is lowered. Now ingredients may be added through the top opening in pot 1801. Before adding liquid ingredients drain 2102 should be closed.

Default settings appear on control panel 1503, activated by lowering cam assembly 1502. If no changes are desired, pressing START button 2403 will begin the cooking process. The user may drain fluids from the pot 1801 by pressing PAUSE button 2408, opening drain 2102, and pushing back on tilt lever 1506. To unload ingredients, slowly raise cam assembly 1502 so that no liquids spill beyond funnel ring wings 2007.

Reverse the process to disassemble for cleaning.

With the personal embodiment, make sure tumbler blade assembly 2705 is inserted into pot 2701 as shown in FIG. 35B. Place pot 2701 on base 2700 after first making sure that sensor arm 2702 is in its open position as shown in FIG. 29 right. Ingredients may now be added into the pot 2701. If the blade of the tumbler blade assembly 2705 is in the way, grasp blade position adjust knob 3301 and rotate the blade to the desired position. Then install cover 2706 by fitting indents 3602 snugly over the top outsides of caddy 3501. Close sensor arm 2702 by pulling the top of it towards pot 2701. If there is resistance preventing a full closing, grasp blade position adjustment knob 3301 and rotate it back and forth until drive hub 3303 engages drive collar 3002 and the mechanism closes fully. This will activate the control panel which works the same as in the compact embodiment.

To drain fluids, install drain gate 2800 into slots at the end of cover 2706. Press PAUSE button 2408 and tilt sensor arm back to its reclining position. Then lift pot 2701 using handle 3101 and tilt the opposite end downward so liquids will flow out of drain holes 3603. To unload ingredients, remove drain gate 2800 and again lower the end of pot 2701 opposite handle 3101 and allow ingredients to exit.

Figure 38:
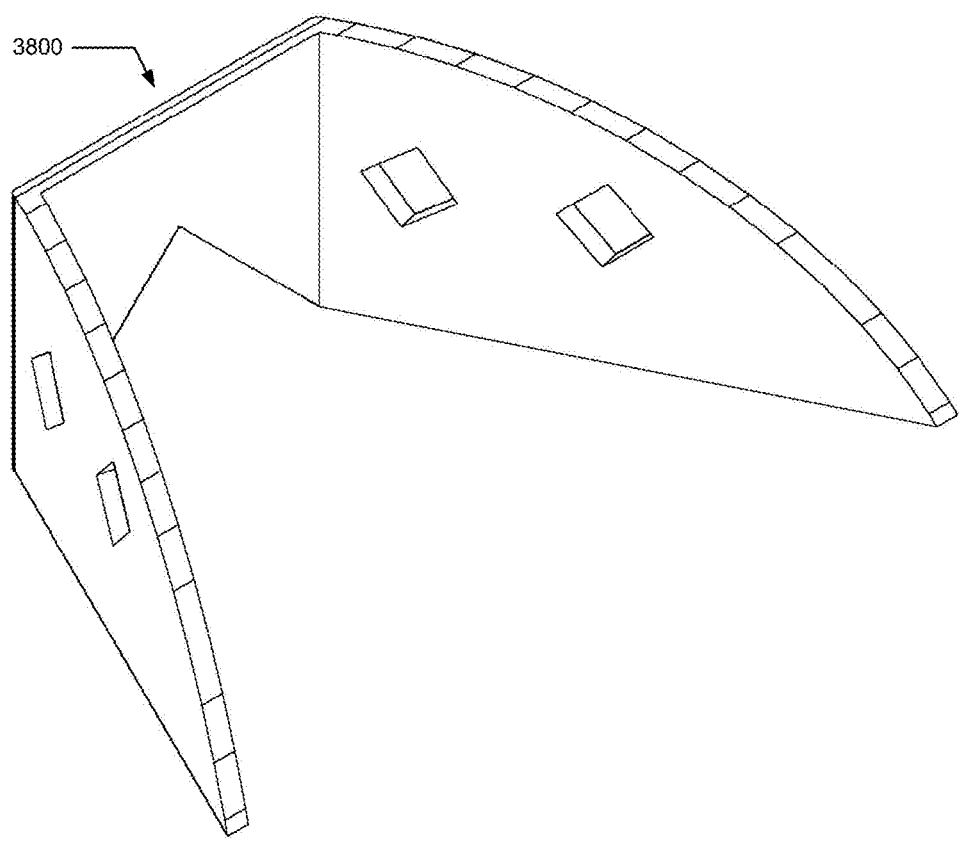
FIG. 38-FIG. 41 illustrate a first tumbler blade.
Figure 39:
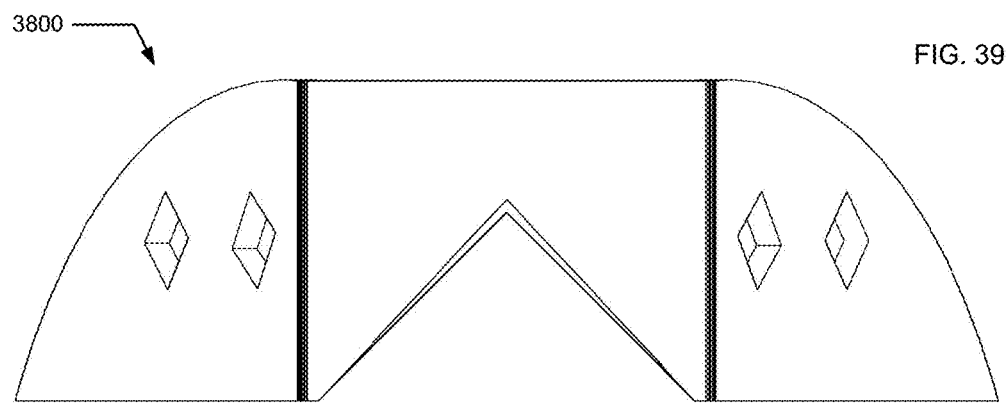
Figure 40:
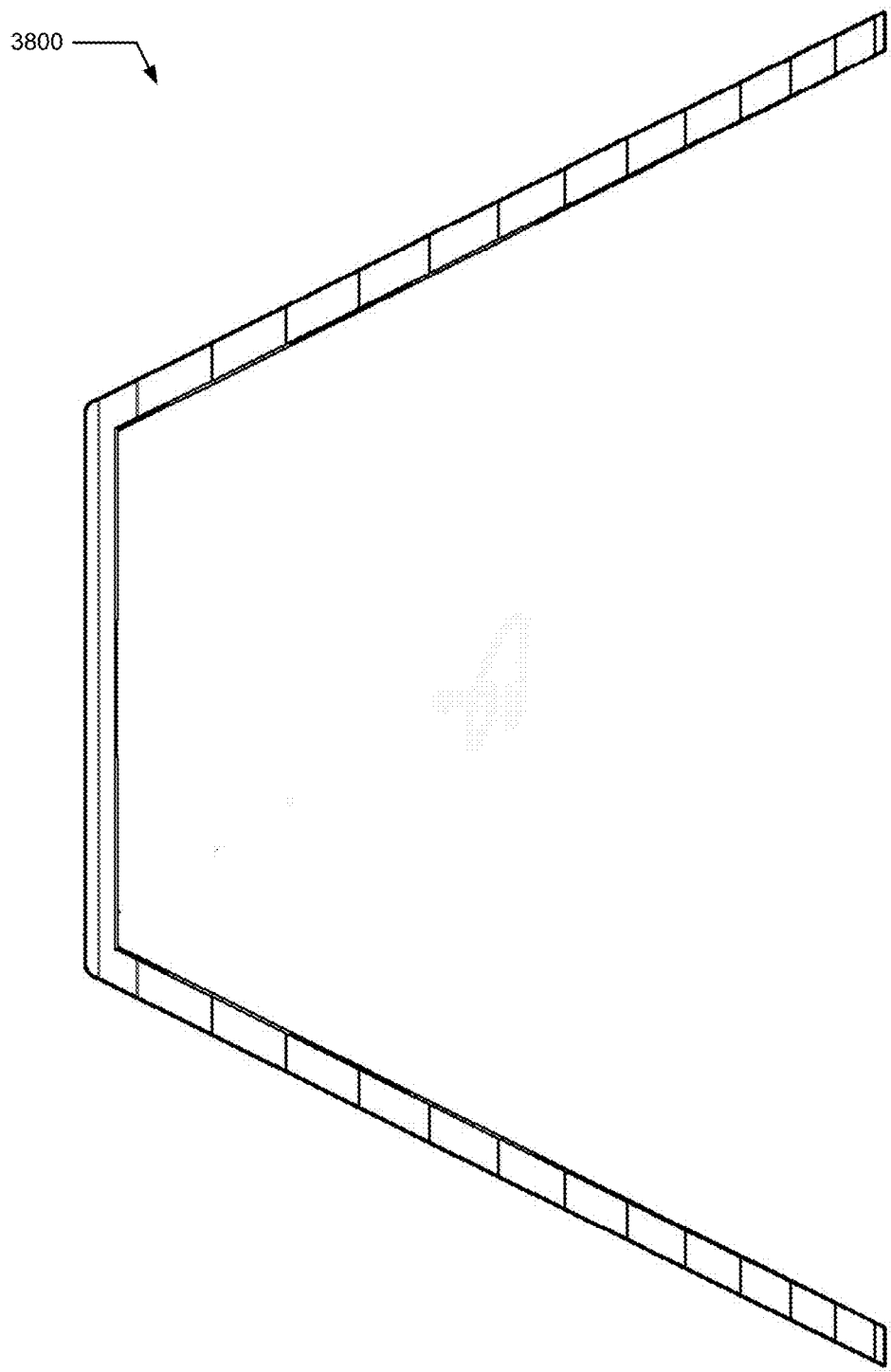
Figure 41:
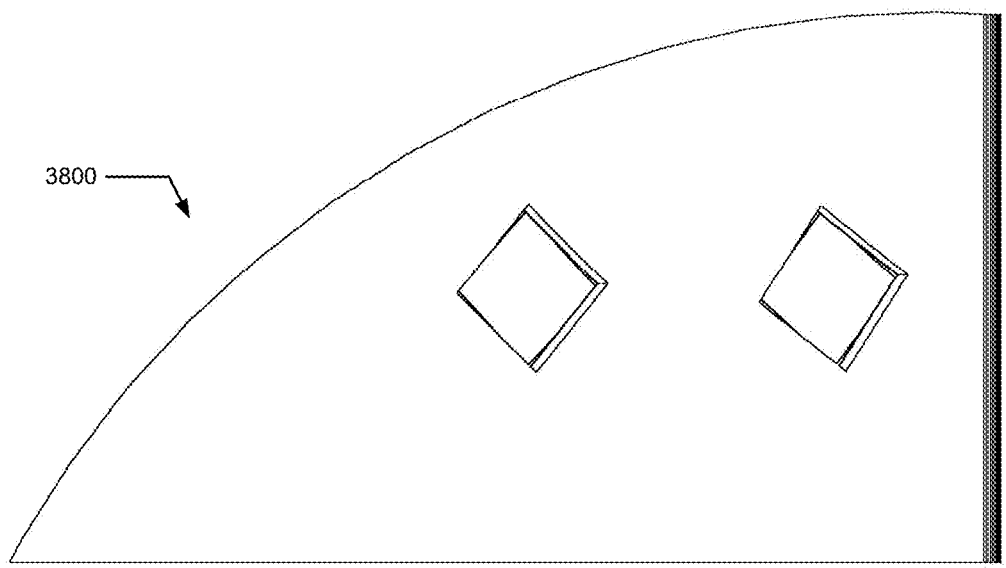

FIG. 38-FIG. 41 illustrate a first tumbler blade 3800, such as used may be used in one of the embodiments disclosed herein. FIG. 38 illustrates a perspective view of first tumbler blade 3800, FIG. 39 illustrates a front view of first tumbler blade 3800, FIG. 40 illustrates a top view of first tumbler blade 3800, and FIG. 41 illustrates a side view of first tumbler blade 3800. First tumbler blade 3800 includes a central first planar portion and a second portion having a pair of angled wings that gather ingredients during relative motion between blade 3800 and an interior wall surface of a cooking chamber. Relative motion results from one or both of the blade and interior wall surface moving. Blade 3800 includes a curved surface which fits against the inside surface of the pot's perimeter. The pivot point about which the blade rotates is the center of the circle formed by the blade arc (when viewed along the axis of rotation) that fits against the pot. Blade 3800 includes a "V" cutout that has an effect of lowering a tumble barrier height—it's particular shape is not relevant to the tumbling/mixing process.

Figure 42:
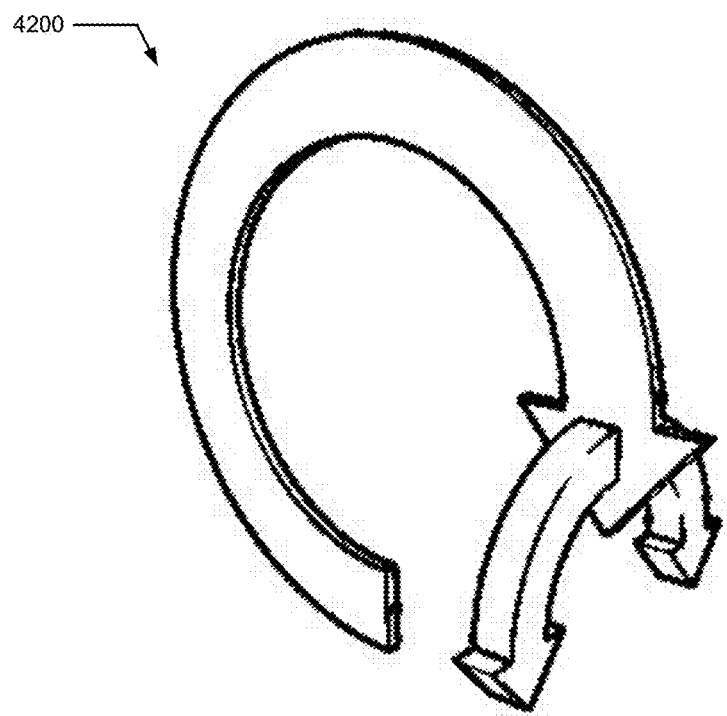
FIG. 42 illustrates a tumbling motion imparted to cooking pieces during heated tumbling by a tumbler blade.

FIG. 42 illustrates a tumbling motion 4200 imparted to cooking food pieces during heated tumbling by a tumbler blade, such as, for example first tumbler blade 3800 or second tumbler blade 4300. Food pieces tumble in a direction of relative motion of the tumbler blade and in an orthogonal direction.

Figure 43:
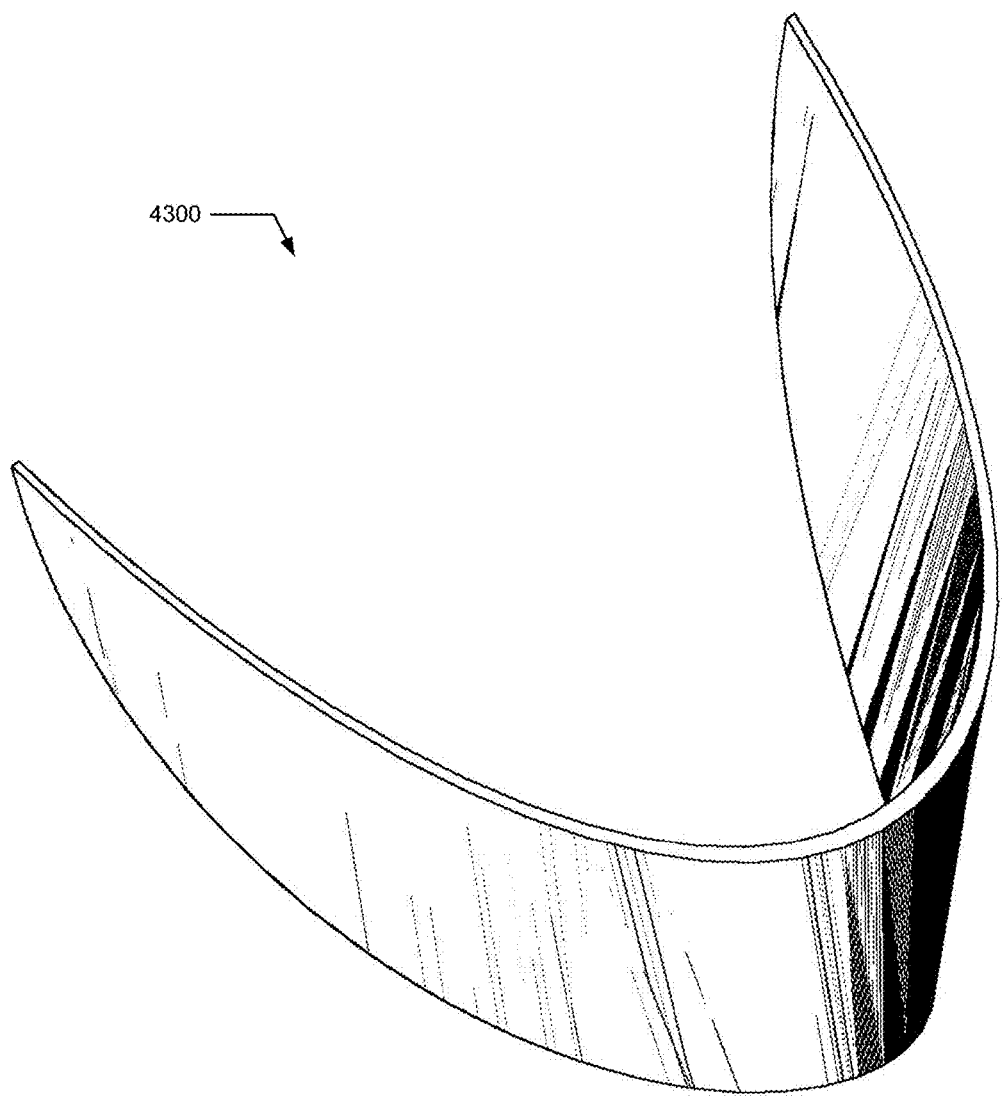
FIG. 43-FIG. 45 illustrate a second tumbler blade.
Figure 44:
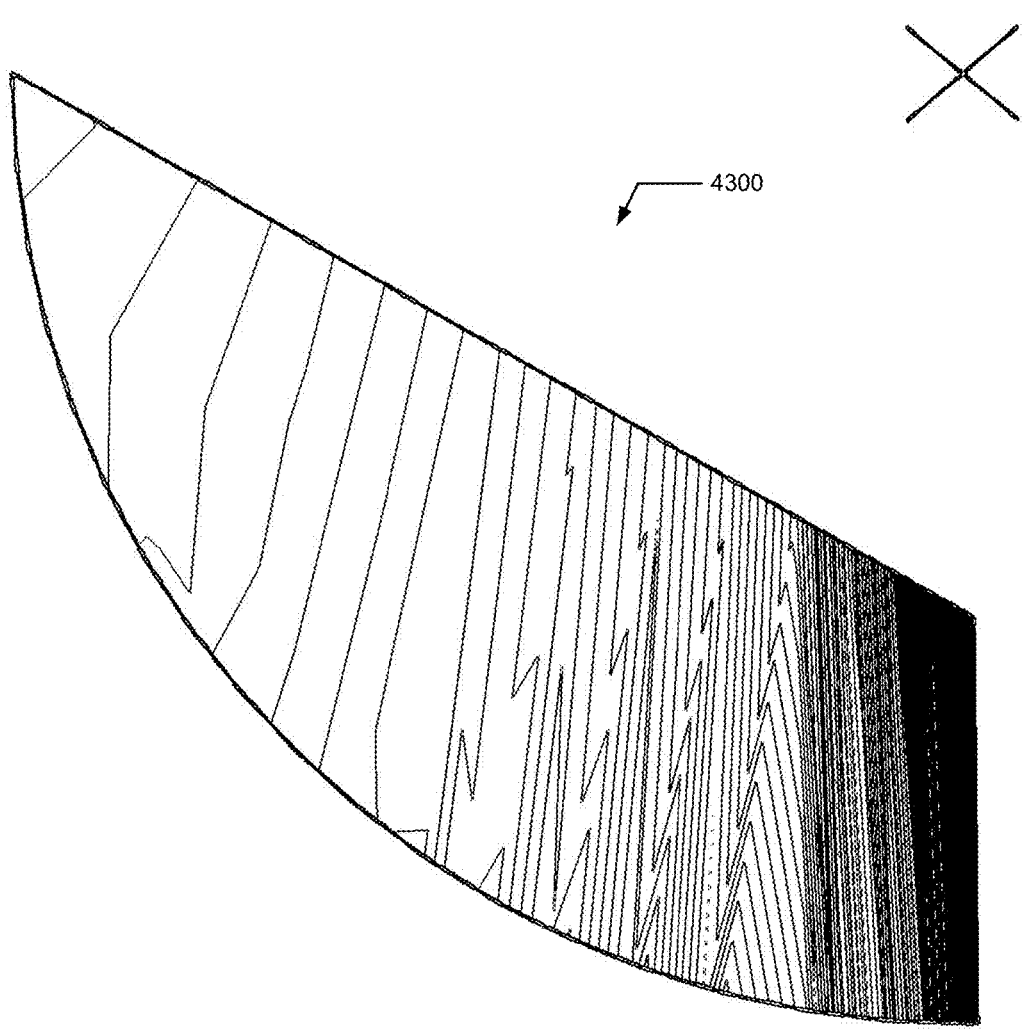
Figure 45:
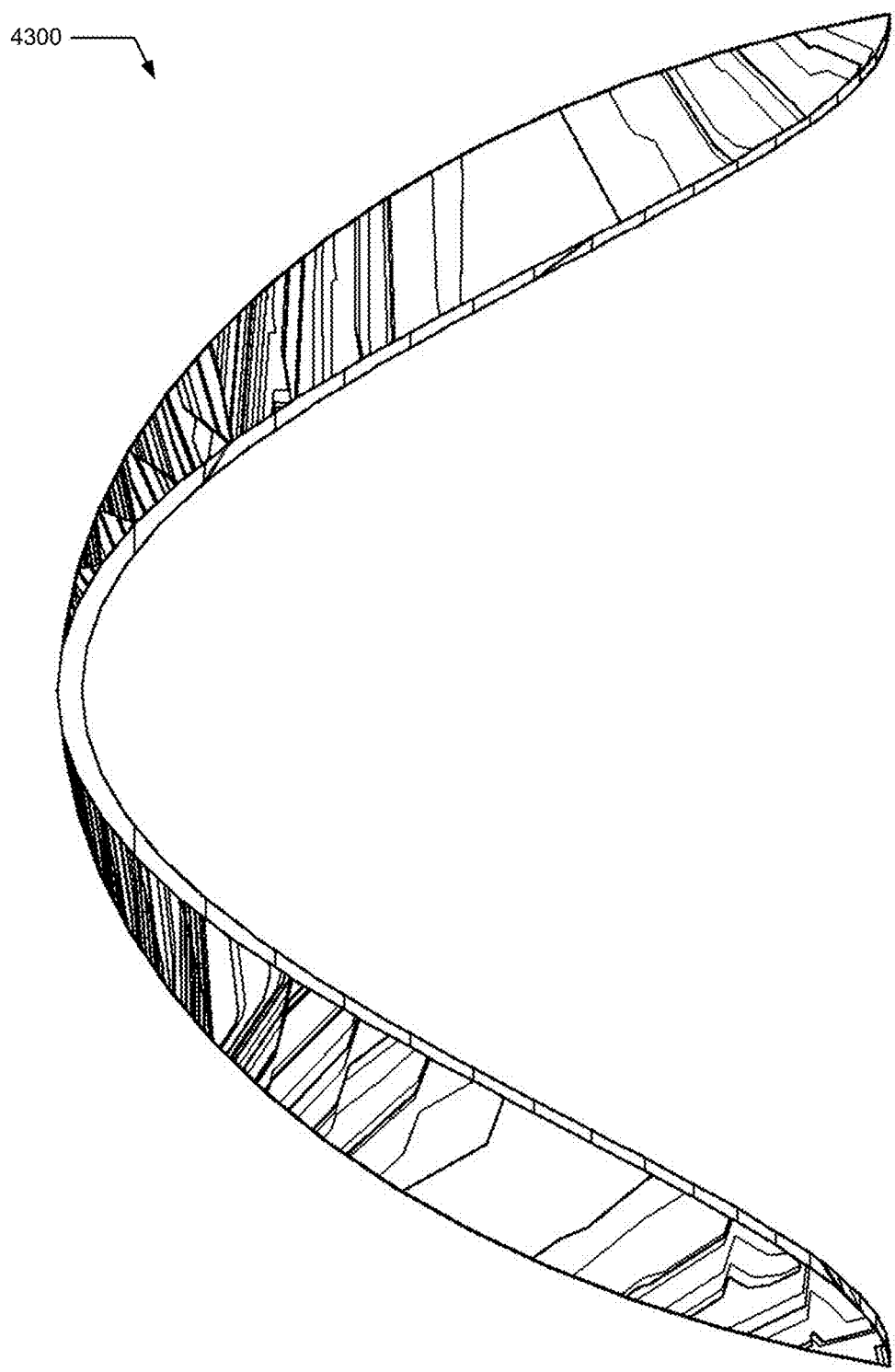

FIG. 43-FIG. 45 illustrate a second tumbler blade 4300, such as used may be used in one of the embodiments disclosed herein. FIG. 43 illustrates a perspective view of second tumbler blade 4300, FIG. 44 illustrates a side view of second tumbler blade 4300 and FIG. 45 illustrates a top view of second tumbler blade 4300. Second tumbler blade 4300 includes a central first portion and a second continuous curve portion that gather ingredients during relative motion between blade 4300 and an interior wall surface of a cooking chamber. Relative motion results from one or both of the blade and interior wall surface moving. Blade 4300 includes a curved surface which fits against the inside surface of the pot's perimeter. The pivot point about which the blade rotates is the center of the circle formed by the blade arc (when viewed along the axis of rotation) that fits against the pot. FIG. 44 illustrates an "X" that may represent a pivot point in some implementations. Blade 4300 does not include a "V" cutout to lowering a tumble barrier height.

Figure 46:
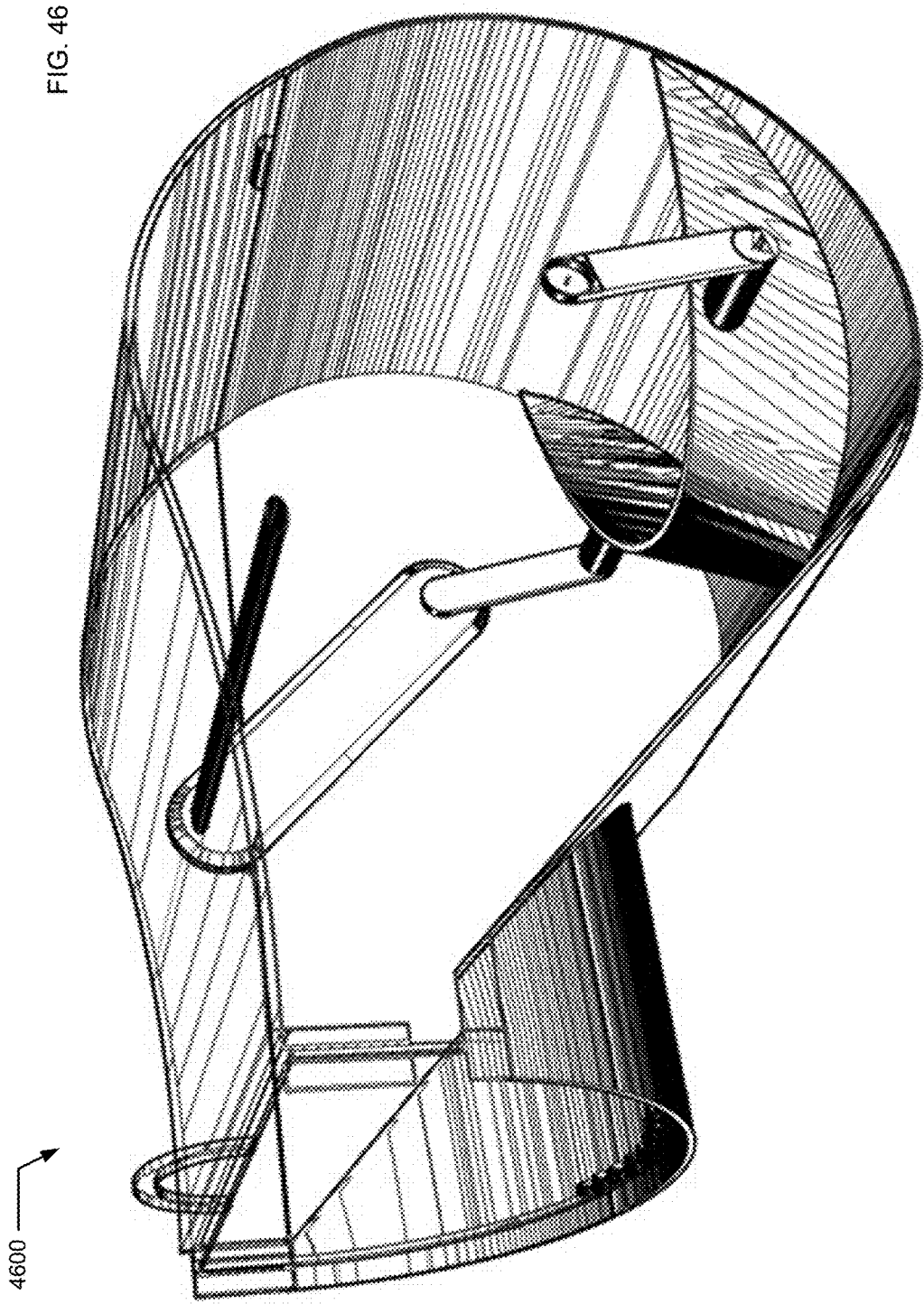
FIG. 46-FIG. 48 illustrates a sequence of views of rotation of a second tumbler blade inside a cooking chamber.
Figure 47:
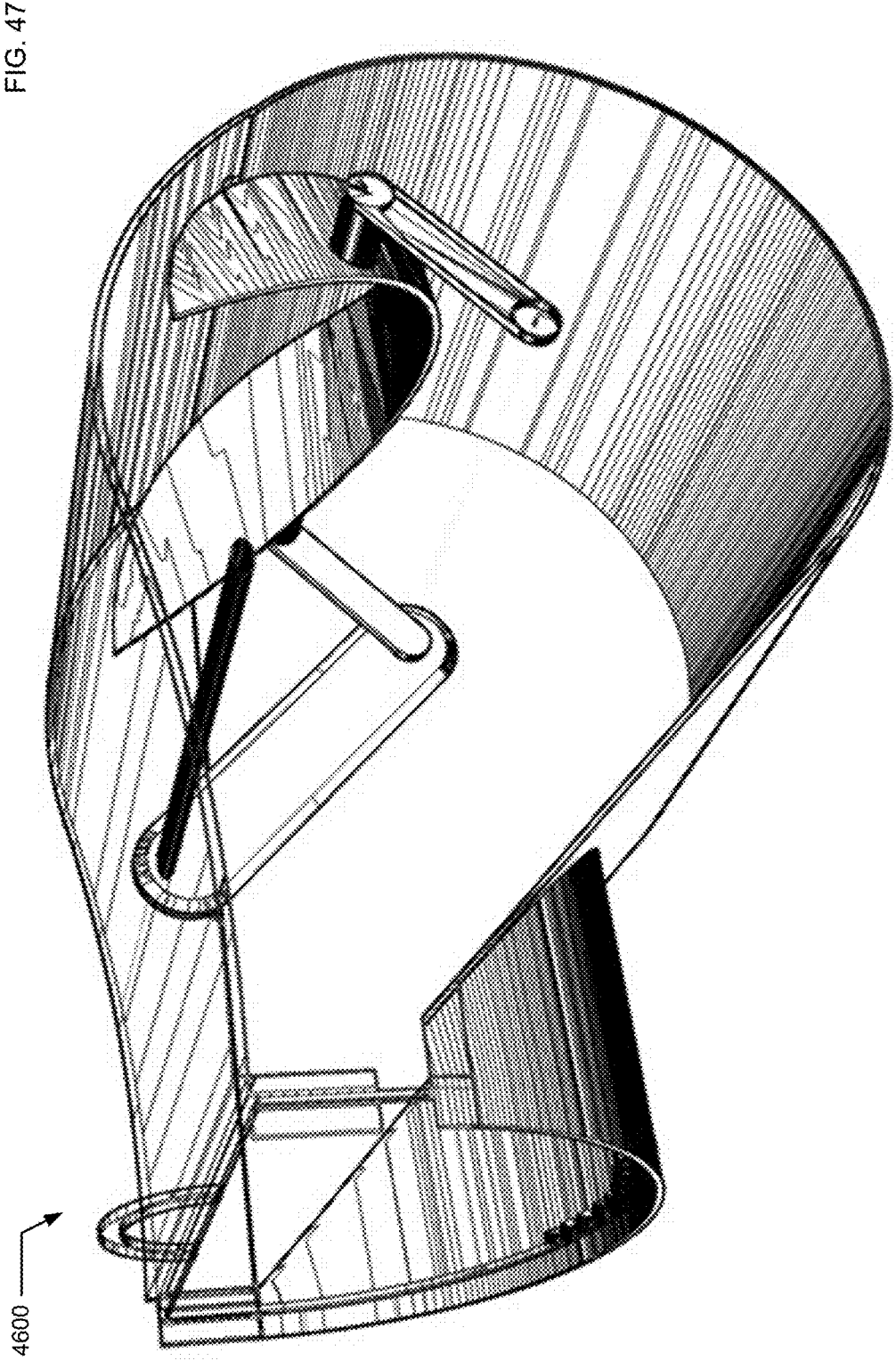
Figure 48:
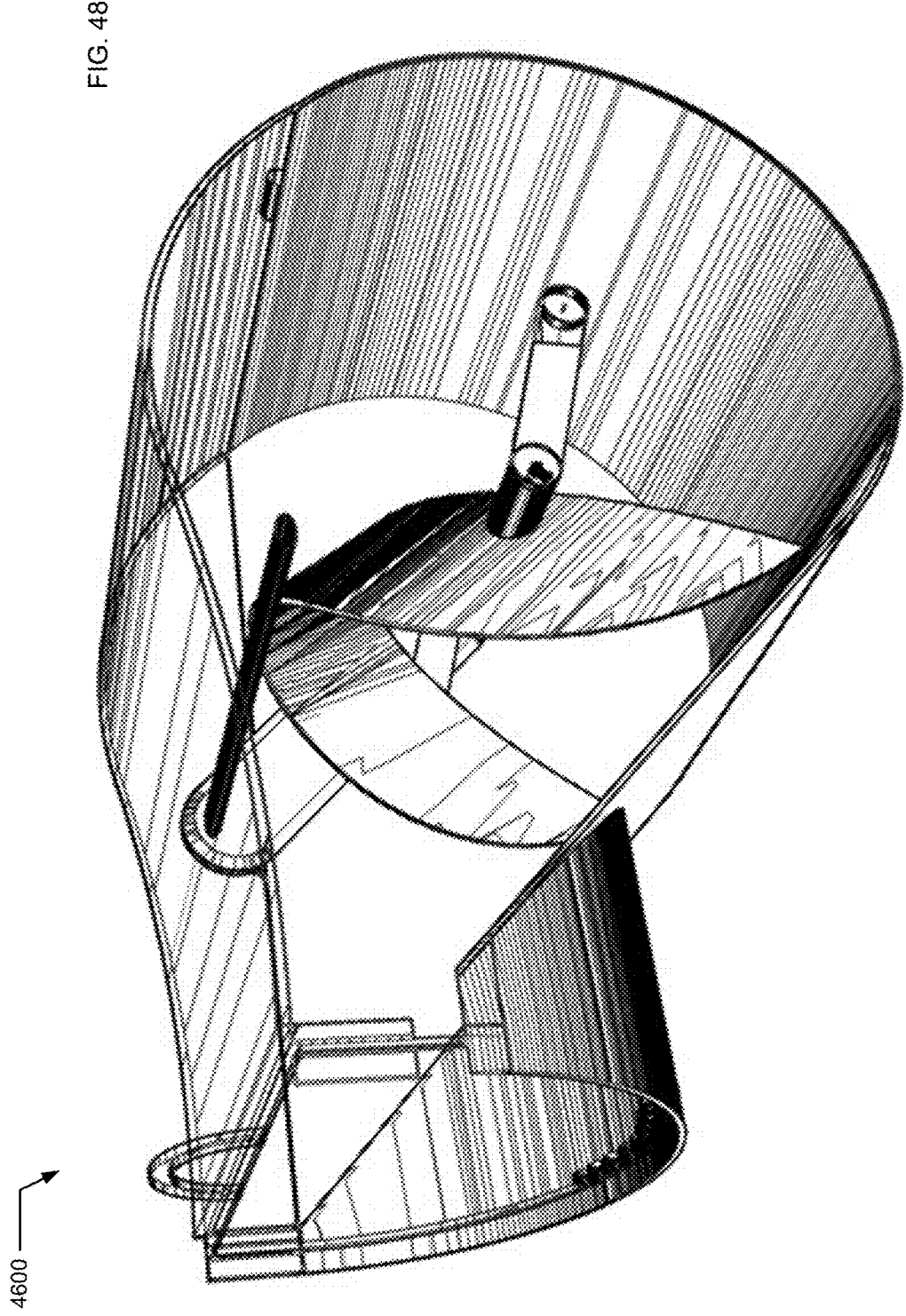

FIG. 46-FIG. 48 illustrates a sequence of views of rotation of a second tumbler blade inside a cooking chamber 4600; each figure depicting a rotating tumbler blade (e.g., second tumbler blade 4300) at a different point of rotation. The tumbler blade rotates continuously and smoothly relative to the cooking volume and cooking surface, imparting the two degree tumbling motion to bite-sized food pieces during rotation.

Figure 49:
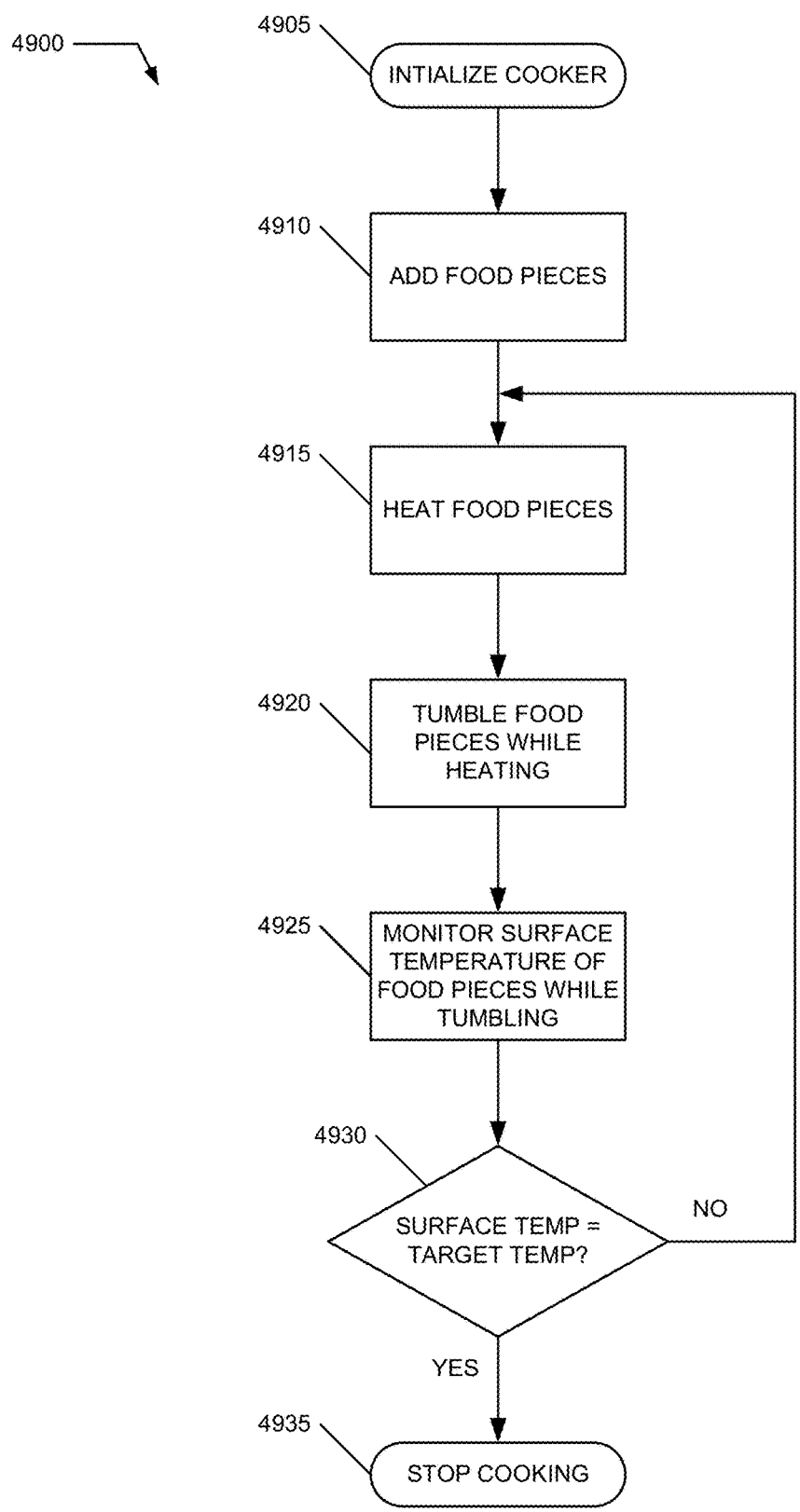
FIG. 49 illustrates a cooking method using an automated cooker.

FIG. 49 illustrates a cooking method 4900 using an automated cooker. Method 4900 may be implemented by a number of pieces of equipment, such as for example one or more of the embodiments described herein and/or illustrated in FIG. 1-FIG. 48. Method 4900 includes a plurality of steps, such as step 4905-step 4935. Method 4900 begins with step 4905 and initializes the cooker. This initialization may include preparation of the device, establishing variables, among other initialization task. Step 4905 includes procedures and functions that are required to occur before cooking starts—as identified in Step 4910-Step 4935.

After initialization, method 4900 performs step 4910 in which bite-sized food pieces are added into a cooking volume. The cooking volume is defined by an interior wall that includes a portion that is able to be heated and which is preferably an arced portion supporting the food pieces (though other portions may be heated). The tumbler blade includes a curved surface complementary to this arc and allows the tumbler blade to move in a circle and include this arced portion, preferably heated, to scoop and tumble the food pieces as described herein.

After step 4910, method 4900 includes step 4915 which heats the food pieces within the cooking volume. Step 4915 includes elevating a temperature of the arced interior wall portion. The heating of the food pieces by the interior wall may be direct or indirect including a direct contact with the wall surface or contact with a cooking liquid (e.g., an oil) that is in contact with the heated interior wall.

After step 4915, method 4900 includes step 4920 to tumble the food pieces while they are being heated. The tumbling occurs in response to relative motion between a tumbler blade and the interior wall (e.g., rotation of the blade with the wall fixed or rotation of the wall with the blade fixed, or a combination of both moving). Step 4920 occurs while the food pieces are being heated. Step 4920 imparts the two-degree tumbling motion to the cooking food pieces as they are gathered from the heated arced portion of the interior wall. This tumbling motion helps to evenly cook the food pieces and remove any hot spots/cold spots on the cooking portion. This even cooking of bite-sized food pieces helps to make the cooking process predictable and manageable by automated cooking.

After step 4920, method 4900 includes step 4925 that monitors the surface temperature of the bite-sized food pieces that are being evenly cooked while tumbled, such as, for example, using an exterior non-contact thermal probe. The thermal probe accesses the food pieces inside the cooking volume through a port.

After step 4925, method 4900 includes step 4930 to test for "doneness" by inferring an internal temperature from the exterior surface temperature. The configuration of the size of the food pieces, tumbling motion, and heating allows a controller to estimate when the food is cooked to the desired interior temperature based upon the exterior temperature. The even tumbled heating of the bite-sized food pieces allows the use of the surface temperature to accurately estimate the interior temperature. When the test at step 4930 is FALSE (e.g., the internal temperature does not have the desired relationship to the bulk exterior temperature), method 4900 branches back to step 4915 to continue heating and tumbling as specified in step 4915-step 4925. At some point, the test at step 4930 will be TRUE and method 4900 will advance to step 4935 to terminate the cooking method. Step 4935 may include warming, powering down, post-cooking processing and other procedures before concluding method 4900.

Fresh non-liquid foods fall into three categories for purposes of being cooked in the invention. Soft vegetables and meats (excluding some seafood) are one category. These can be properly cooked, even when mixed together, by raising them gradually to a temperature of around 170° F. No extended cooking time ("Stay Hot" time 735) is required unless the vegetables are desired to cooked to increased softness but any accompanying meats will likely be overcooked. A second category includes dense vegetables such as root vegetables and some squashes. To reach doneness these foods need to absorb more energy—either by being raised to a higher temperature or being maintained at lower cooking temperatures for an extended period. Finally, there are foods which slowly hydrate in a heated state such as dried beans. The invention can accommodate the cooking requirements of all these groups. The first group requires the food to be raised to a given temperature to reach doneness. After reaching that temperature the invention needs only to keep the food warm for serving. The default settings usually suffice for these cooking tasks. For the second group some "Stay hot" time will be required and can be set using the buttons 725 corresponding to display 735. For foods in the third category the cooking time can be extended, if needed, beyond the normal 30 minute "Stay Hot" time limit 735 by setting the Keep Warm temperature 740 to a high enough setting to continue the cooking process.

The parameter range for values entered on the control panel 165 will vary for different embodiments of the invention and the purposes for which they are intended. For the home consumer using an induction based embodiment limited to 1200 to 1800 watts, for example, the maximum "heat to" temperature 730 may be around 225° F. and the maximum "keep warm" temperature 740 might be set at a simmering temperature of 185° F. Some cooking tasks such as browning or braising at higher temperatures may require a more robust embodiment.

The operation is the same for frozen foods as for fresh foods. They just take longer. Popular "skillet dinners" which combine a selection of frozen ingredients (example: 3 lb. 10 oz. "Grilled Seasoned White Chicken and Pasta with Broccoli Florets, Carrots and Corn in a Garlic Sauce" requiring only the addition of water) can be loaded and ready to eat using the default settings (with the O-ring 330 installed) in slightly more time than preparation in a skillet would require and less time than that needed for preparation using a microwave. In addition, all the extensive manual handling and timing tasks required by each of these methods would be eliminated.

An alternative embodiment of the system would employ the same pot but without the inset. Support, torque and traction to rotate the pot would be supplied by rollers located to the right and left front as well as the right and left rear. All rollers would be located above but not far from the heating element boundaries. Only the front or rear rollers would be driven because of the different front and rear rotation rates needed by the tapering pot. Special attention would be taken to assure traction, such as teeth on the rollers engaging teeth etched into the pot where the rollers make contact. The pot would be restrained from falling forward (when tilted down) by magnets but the attraction would be set so the pot would still be removable. Tumbler blades would be clipped over the inner circumference of the retaining ring. The squeegee option would not be possible. The swing arm assembly would remain the same. The advantage would be that the pot would have a flat bottom and could be used, possibly with magnetically attaching handles, on other cooktop surfaces.

In addition to the "roller based" design illustrated and described herein, there is another likely embodiment in which the pot would have the same shape but would not rotate, for example, implementations of the compact and personal embodiments may not rotate the pot. Instead, only the tumbler blades would rotate. This could be more energy efficient but may be rougher on the food particles, especially without a non-stick coating, possibly resulting in more food particle deformation/separation.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. An automated cooker processing a plurality of bite-sized food pieces, comprising:
   a cooking chamber defining a closed cooking volume having an interior wall surface exposed to said cooking volume, said interior wall surface having a circular arc portion;
   a heating structure configured to raise a temperature of said interior wall surface to a desired cooking temperature, said desired cooking temperature in a range of ambient up to 400 degrees Fahrenheit;
   a tumbler blade disposed within said cooking volume and including a leading edge complementary to said circular arc, said tumbler blade having a first portion configured to tumble the food pieces in a first direction within said cooking volume in response to a relative movement between said tumbler blade and said interior wall surface, wherein said tumbler blade includes a second portion configured to tumble the food pieces in a second direction orthogonal to said first direction within said cooking volume in response to said relative movement, said directions evenly heating exterior surfaces of the food pieces, responsive to said cooking temperature, up to 225 degrees Fahrenheit;
   a drive mechanism coupled to said tumbler blade and said cooking chamber, said drive mechanism configured to produce said relative rotation between said tumbler blade and said interior wall surface; and
   a non-contact thermal probe, outside said cooking volume, configured to determine a surface temperature of said exterior surfaces through an aperture in said interior wall surface; and
   a controller, coupled to said non-contact thermal probe, said heating structure, and to said tumbler blade, to operate said heating structure and said relative rotation until said surface temperature represents an internal temperature of the food pieces.

2. The cooker of claim 1 further comprising a tumbler blade assembly coupled to said cooking chamber, said tumbler blade assembly including said tumbler blade with said tumbler blade assembly reusably removeable from said cooking container.

3. The cooker of claim 1 wherein said cooking chamber includes a generally horizontal pivot axis for said tumbler blade rotation.

4. The cooker of claim 3 wherein said cooking chamber includes a lateral side exit coupled to said interior volume.

5. The cooker of claim 1 wherein said cooking chamber includes a handheld cook pot.

6. The cooker of claim 4 wherein said cooking chamber includes a handheld cook pot.

7. The cooker of claim 4 further comprising a drain gate coupled to said lateral side exit, said drain gate configured to drain a liquid from within said cooking volume while retaining said food pieces within said cooking volume.

8. The cooker of claim 6 further comprising a drain gate coupled to said lateral side exit, said drain gate configured to drain a liquid from within said cooking volume while retaining said food pieces within said cooking volume.

9. An automated cooker processing a plurality of bite-sized food pieces, comprising:
- a cooking chamber defining a closeable cooking volume having a pair of spaced-apart closed ends and an interior wall surface extending between said closed ends, said interior wall surface exposed to said cooking volume and having a cylindrical arc portion defining a center of rotation for a set of cross-sections of said cylindrical arc portion wherein said closed cooking volume defines a chamber axis extending through said closed ends and wherein said chamber axis is aligned with said center of rotation and wherein said center of rotation is generally horizontal during a cooking operation, with said cooking chamber defining, in said interior wall, a lateral opening to an external ambient;
- a heating structure configured to raise a temperature of said interior wall surface to a desired cooking temperature above said external ambient during said cooking operation;
- a tumbler blade, disposed within said cylindrical arc portion, configured for rotation about said center of rotation during said cooking operation and including a leading edge complementary to said cylindrical arc portion, said tumbler blade having a first portion configured to tumble the food pieces in a first direction within said cooking volume in response to a relative movement between said tumbler blade and said interior wall surface around said center of rotation, wherein said tumbler blade includes a second portion configured to tumble the food pieces in a second direction different from said first direction within said cooking volume in response to said relative movement, said directions evenly heating exterior surfaces of the food pieces, responsive to said cooking temperature;
- a drive mechanism coupled to said tumbler blade and said cooking chamber, said drive mechanism configured to produce said relative rotation between said tumbler blade and said interior wall surface; and
- a controller, coupled to said heating structure and to said tumbler blade, to operate said heating structure and said relative rotation until said surface temperature represents an internal temperature of the food pieces.

10. The automated cooker of claim 9 wherein a chute, coupled to said cooking volume and including said lateral opening, extends generally horizontally from said cooking volume.

11. The automated cooker of claim 9 wherein said first portion of said tumbler blade includes a central region parallel to said rotation axis configured to lift, rotate, and drop the plurality of bite-sized food pieces about said rotation axis within said cooking volume and wherein said second portion of said tumbler blade includes a pair of lateral swept regions on opposing sides of said central region configured to center the plurality of bite-sized food pieces within said cooking volume as they are dropped to produce a centered pile on said interior wall within said cooking volume.

12. The automated cooker of claim 10 wherein said first portion of said tumbler blade includes a central region parallel to said rotation axis configured to lift, rotate, and drop the plurality of bite-sized food pieces about said rotation axis within said cooking volume and wherein said second portion of said tumbler blade includes a pair of lateral swept regions on opposing sides of said central region configured to center the plurality of bite-sized food pieces within said cooking volume as they are dropped to produce a centered pile on said interior wall within said cooking volume.

* * * * *